United States Patent
Free

(10) Patent No.: US 6,289,867 B1
(45) Date of Patent: Sep. 18, 2001

(54) ROTARY ENGINE

(75) Inventor: Paul Douglas Free, Columbus, IN (US)

(73) Assignee: Cummins Engine Company, Inc., Columbus, IN (US)

( * ) Notice: Subject to any disclaimer, the term of this patent is extended or adjusted under 35 U.S.C. 154(b) by 0 days.

(21) Appl. No.: 09/523,236

(22) Filed: Mar. 10, 2000

Related U.S. Application Data

(60) Provisional application No. 60/127,082, filed on Mar. 31, 1999.

(51) Int. Cl.$^7$ ..................................................... F02B 53/00
(52) U.S. Cl. ........................ 123/245; 123/211; 418/104; 418/112
(58) Field of Search ..................................... 418/104, 112, 418/113, 36; 123/245, 200, 211

(56) References Cited

U.S. PATENT DOCUMENTS

| | | |
|---|---|---|
| 1,298,839 | 4/1919 | Weed . |
| 2,050,603 | 8/1936 | Gardner . |
| 2,734,489 | 2/1956 | Tschudi . |
| 3,824,963 | 7/1974 | Eda . |
| 3,854,457 | 12/1974 | Taurozzi ............................... 123/8.47 |
| 4,194,871 | 3/1980 | Studenroth ............................ 418/38 |
| 4,604,909 | 8/1986 | Marson ................................. 74/63 |
| 4,938,668 | 7/1990 | Schukey ................................ 418/38 |
| 5,326,238 | 7/1994 | Schukey ................................ 418/36 |
| 5,429,085 * | 7/1995 | Stauffer ................................ 123/245 |
| 5,537,973 | 7/1996 | Wittry .................................. 123/202 |
| 5,622,149 * | 4/1997 | Wittry .................................. 418/36 X |
| 5,740,765 * | 4/1998 | Ball et al. ............................ 418/36 X |

* cited by examiner

*Primary Examiner*—Hoang Nguyen
(74) *Attorney, Agent, or Firm*—Woodard, Emhardt, Naughton, Moriarty & McNett

(57) ABSTRACT

A rotary engine having a pair of nested rotors positioned with a housing to define a central combustion chamber and four subchambers having variable volumes. Rotors are mounted about a driveshaft extending through the housing. The rotary engine utilizes tunable gas compression and expansion in order to manage emissions without needing exhaust gas recirculation or a complicated and expensive fuel injection system. The rotary engine is relatively simple and inexpensive to manufacture, has no valve train, is vibrationless, has high power density, and has a wide speed range.

27 Claims, 29 Drawing Sheets

ROTARY ENGINE

CROSS-REFERENCE TO RELATED APPLICATIONS

This application claims priority to U.S. Provisional Application Ser. No. 60/127,082 filed Mar. 31, 1999.

TECHNICAL FIELD OF THE INVENTION

The present invention relates generally to internal combustion engines and, more particularly, to a rotary engine.

BACKGROUND OF THE INVENTION

Central to the operation of any internal combustion engine are three components: the working volume, the power transmission, and the timing mechanisms. The working volume of a reciprocating piston engine is created by a cylindrical chamber capped at one end by the head and at the other end by a movable piston. The power of expanding gas forces the piston down and is transmitted to offset journals on the crankshaft through a connecting rod. The timing is controlled by the position of the offset journals on the crank and by a cam operated poppet valve assembly in the head.

History has proven that there is an intense and timeless desire to improve the internal combustion (IC) engine. Improving fuel efficiency, power density, cost, and/or durability would be very appealing to any IC engine user. Improving most of these attributes without degrading others would be a dramatic advance in engine technology. Each year hundreds of attempts and millions of dollars are poured into making small improvements to the IC engine. Designers continue, however, to spend money looking for the one elusive key that will unlock a major advance in engine technology.

Over the years the rotary engine has been especially attractive in this search for a dramatic technological advance because of its demonstrated ability to deliver power in a small package. One of the primary advantages of the rotary engine is the simplicity of the mechanism that defines the working volume, power transmission and timing mechanisms. The simplicity of design not only reduces the number of moving parts, therefore increasing reliability, but the more efficient packaging reduces the outside envelope of an engine of given displacement.

The Wankel engine designed throughout the late 1930's and early 1940's by Felix Wankel and sold commercially by a number of companies, including Mazda Motor Company, is currently the most well known rotary engine. This engine proved popular even though it had several problems, including high hydrocarbon emissions, contributed to by such factors as rotor sealing, lubrication and port configuration, only a single power pulse per revolution per stage, and poor fuel economy. But, more importantly, this engine showed that the rotary engine could successfully be used in a mass-produced automotive market if appropriate attention, time and money are spent to develop the technology.

While the Wankel is the most well known rotary engine, it is by far not the only rotary engine known in the prior art. Many rotary engines have been patented in the past, including U.S. Pat. No. 1,298,839 to Weed; U.S. Pat. No. 2,050,603 to Gardner; U.S. Pat. No. 2,734,489 to Tschudi; U.S. Pat. No. 3,824,963 to Eda; U.S. Pat. No. 3,854,457 to Taurozzi; U.S. Pat. No. 4,194,871 to Studenroth; U.S. Pat. No. 5,326,238 to Schukey and U.S. Pat. No. 4,604,909 to Marson.

The thing that all of these engines have in common is the "rotating piston" design. All of these engines use a set of rotors that move within an annular volume. The difference between these prior art engines is primarily in the design the linkage that transmits the power and timing the engine. The Tschudi Engine, for example, uses a modified Geneva mechanism to move the pistons around the volume in alternating steps. This results in an engine that takes two revolutions to complete a power cycle (i.e., transmit a power pulse to each piston), giving it a power density similar to a reciprocating piston engine. Still other prior art engines took advantage of the fact that a mechanism could be created that allowed the engine to complete one power cycle per chamber every revolution. This increased the potential power density in the engine, but the fragile mechanisms used for timing these engines led to their downfall. All of these engines were susceptible to various failure modes.

Therefore, the various prior art rotary engine designs indicate that the rotary engine concept has the potential to outperform reciprocating piston engines in most respects if a more practical design can be developed. The present invention is directed toward meeting this need.

SUMMARY OF THE INVENTION

The present invention relates generally to a rotary engine having a pair of nested rotors mounted about a driveshaft and having appended vanes which define four variable volume combustion chambers. The present invention utilizes tunable gas compression and expansion in order to manage emissions without needing exhaust gas recirculation (EGR) or a complicated and expensive fuel injection system. The present invention is also relatively simple and inexpensive to manufacture, has no valve train, is vibrationless, has high power density, and has a wide speed range. The design of the rotary engine of the present invention therefore offers improvements in several areas of the engine.

DETAILED DESCRIPTION OF THE PREFERRED EMBODIMENTS

Figure 1:
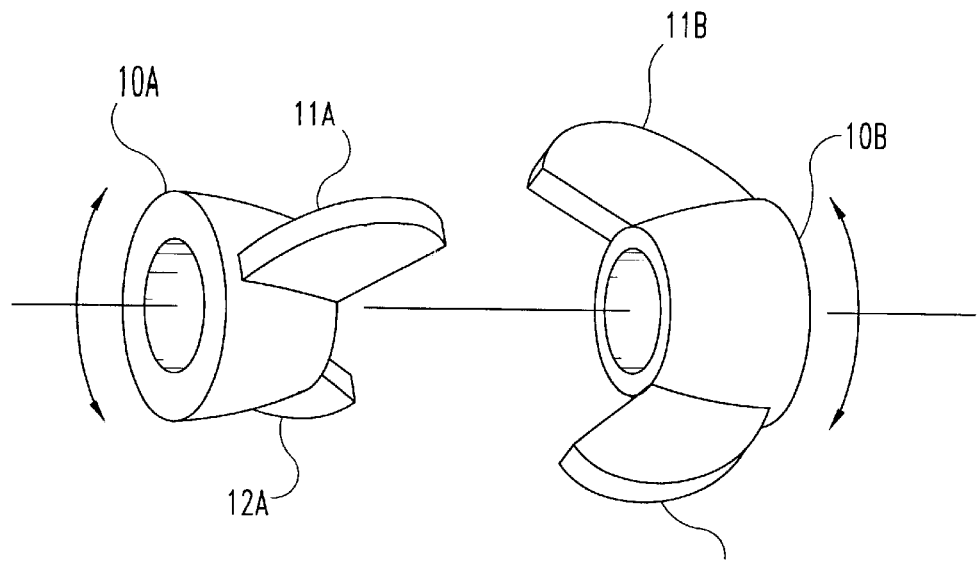
FIG. 1 is a perspective view of a first embodiment pair of rotors of the rotary engine of the present invention.

For the purpose of promotion an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principle of the invention as illustrated therein being contemplated as would normally occur to one skilled in the art to which the invention relates.

The present invention relates to a rotary engine, illustrated in FIG. 1, having four combustion chambers 7A, B, C, D defined by two rotors 10A and 10B. The gas expansion section of rotary engine is composed of two rotors 10A, B which are mounted upon a common drive shaft (not shown in FIG. 1). Rotors 10A, B face each other and move within an enclosed cavity (not shown in FIG. 1) with oscillatory rotary motion superimposed upon uniform rotary motion. Rotors 10A, B are interdigitated in that each of rotors 10A, B includes two vanes 11 and 12 located 180° apart.

Figure 2:
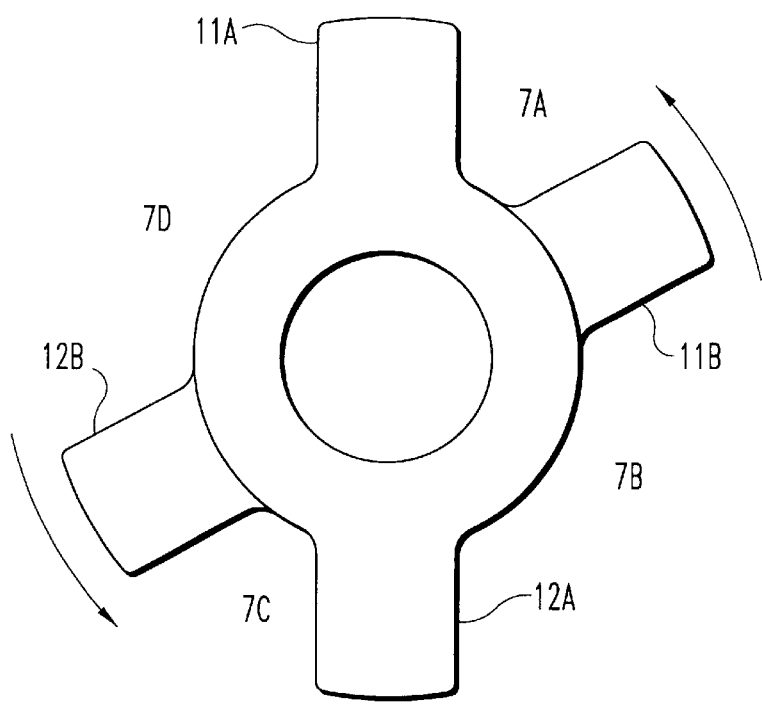
FIG. 2 is an end elevational view of a pair of rotors according to the present invention, illustrating the location of the four combustion chambers of the rotary engine.

As described in greater detail hereinbelow, rotors 10A, B are mounted to driveshaft 204 in such a way that rotors 10A, B can be rotated approximately 90° relative to one another. As illustrated in FIG. 2, it can be observed by looking at rotors 10A, B from one end that the spaces defined by rotor vanes 11 and 12 and the cylindrical cavity in which rotors 10A, B rotate form four combustion chambers 7A–D. Moving one of rotors 10A, B with respect to the other rotor 10B, A causes the volume of all four chambers 7A–D to be altered. Two of the chambers 7A, C get smaller, while two of the chambers 7B, D get larger. By superimposing oscillatory rotary motion upon uniform rotary motion of rotors 10A, B these four chambers 7A–D can be associated with the four parts of the Otto cycle, namely intake, compression, expansion, and exhaust.

Figure 3A:
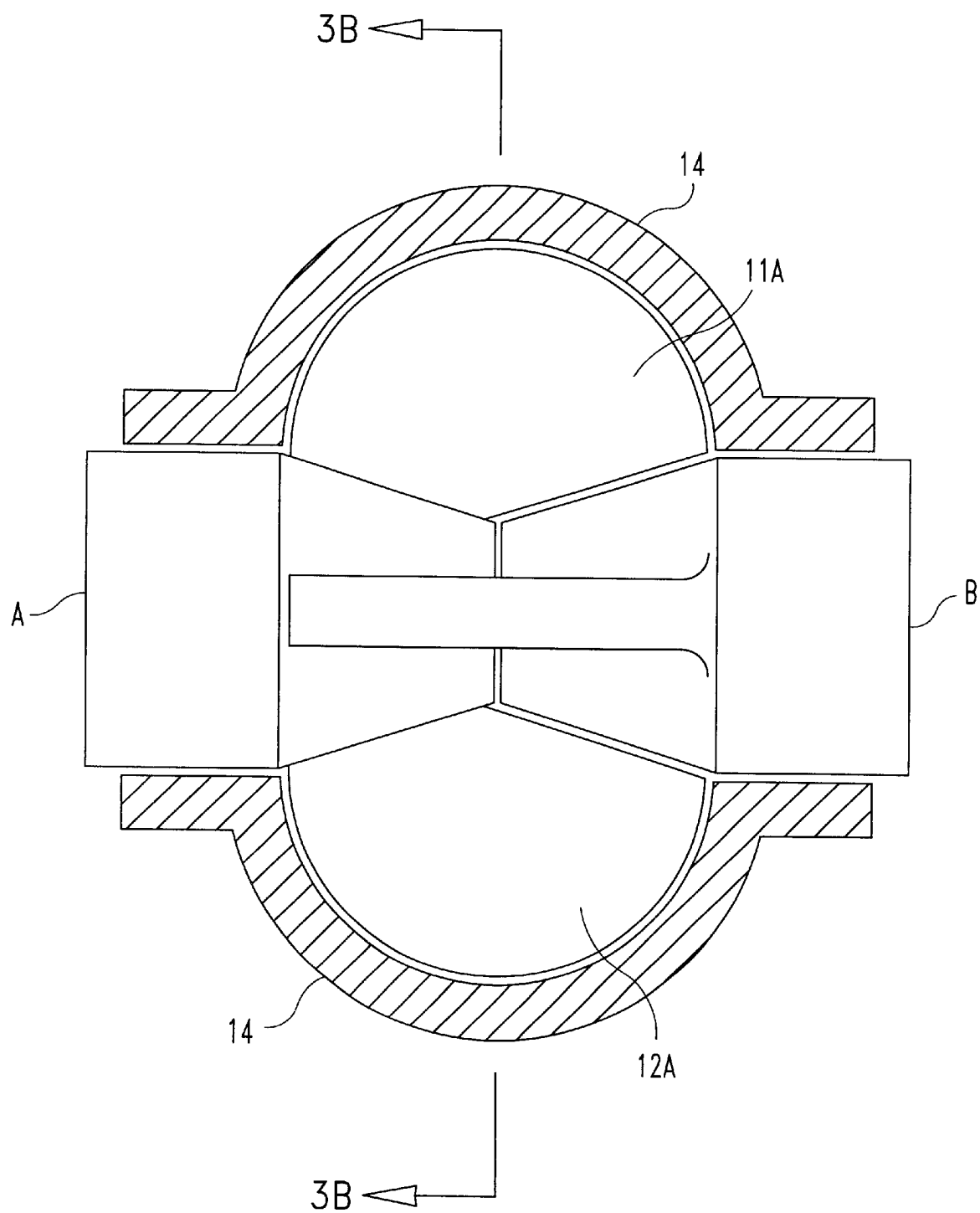
FIG. 3A is a partial cross-sectional side view of the nested rotors of the present invention contained within an engine housing.
Figure 3B:
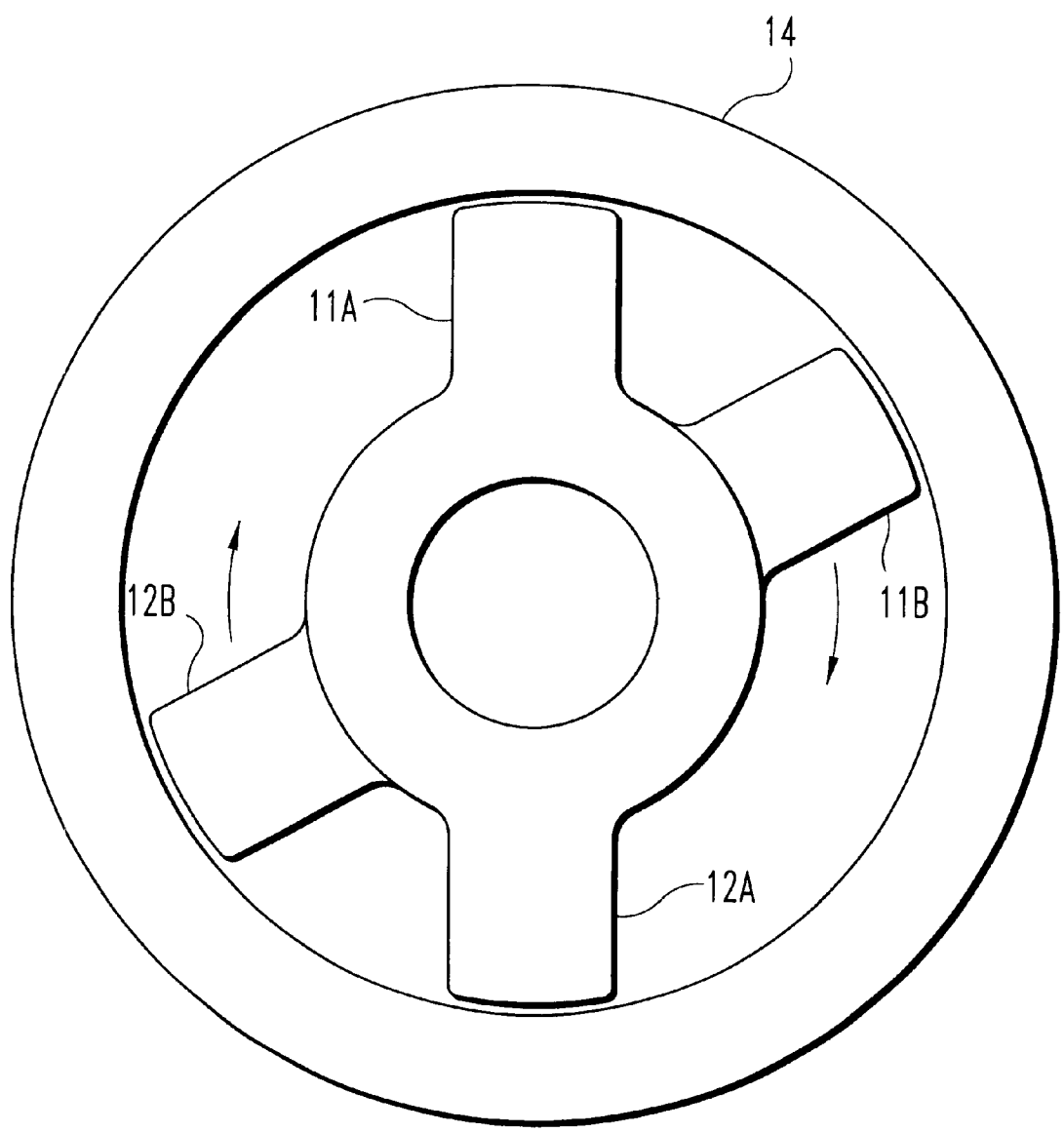
FIG. 3B is a partial cross-sectional side view of the arrangement of FIG. 3A.

Referring to FIG. 3, the outer edges of rotor vanes 11 and 12 are preferably formed in a circular configuration so that the vanes mate with a toroidal outer casing 14. This outer casing 14 encloses the four combustion chambers 7A–D so that compression and expansion will occur in all four chambers 7A–D when one rotor 10 is moved with respect to the other. As described hereinbelow in greater detail, a suitable system of seals is desirable in order to prevent gases from bleeding through the clearances between the vanes 11 and 12 and the casing 14 and into adjacent combustion chambers 7.

Figure 4A:
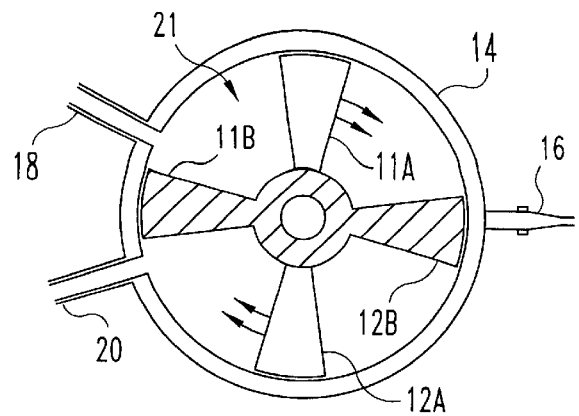
FIGS. 4A–D are schematic end elevational views of a nested rotor pair inside a housing, illustrating an Otto cycle of the rotary engine of the present invention.
Figure 4B:
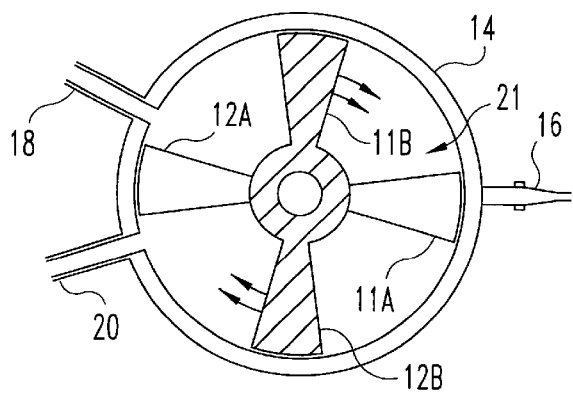
Figure 4C:
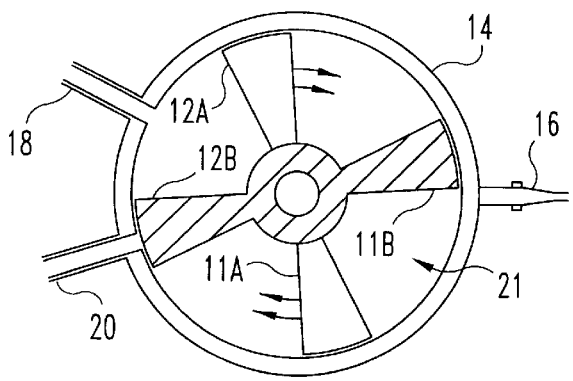
Figure 4D:
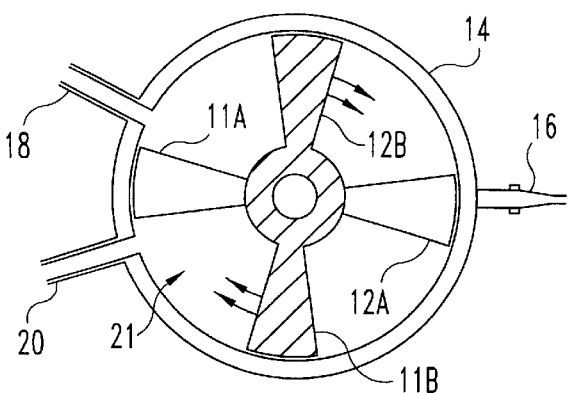

Referring now to FIGS. 4A–D, it can be seen that if an intake port 18 and exhaust port 20 are provided in housing 14, and if an ignition source 16, such as a spark plug or diesel fuel injector, are also provided in housing 14, the four portions of the Otto cycle can be accomplished in one complete rotation of rotor set if rotors 10A, B are moved in a certain way with respect to one another. As shown in FIG. 4A, the uppermost chamber 7A has just completed the intake cycle and has been filled with a quantity of air and fuel through the intake port 18. During this intake portion of the Otto cycle, rotor 10B is rotating at a rate slower than rotor 10A, thereby causing expansion of upper chamber 7A during the intake portion. In other words, vane 11A is moving away from vane 11B during this intake cycle. Referring to FIG. 4B, after intake is complete, the compression portion begins by causing rotor 10B to rotate at a speed greater than rotor 10A. In other words, vane 11A and vane 11B are now moving toward one another. This causes a reduction in the size of chamber of interest 7A, thereby compressing the air/fuel mixture during the compression portion of the Otto cycle. Once chamber of interest 7A has been fully compressed, it moves past ignition source 16, which fires at this point, thereby initiating combustion. As shown in FIG. 4C, the chamber of interest 7A undergoes expansion as the air/fuel mixture combusts, whereby much of the energy of combustion is translated into the rotational motion of driveshaft 204. Finally, FIG. 4D illustrates chamber of interest 7A passing exhaust port 20, where exhaust gases from the combustion process are expelled. Vane 11B is moving toward vane 11A at this point, decreasing the size of chamber of interest 7A and thereby forcing exhaust gases out of port 20.

As will be apparent from a study of FIG. 4, each chamber 7A–D may complete four parts of the Otto cycle during one revolution of rotor set 10 if rotors 10A, B are made to accelerate and decelerate with respect to one another as they sweep through their revolution. Some motion control mechanism must therefore arrange for proper motion between rotors 10, as is described in greater detail hereinbelow. Those having ordinary skill in the art will recognize that there is an economy of motion in the present design wherein four different chambers 7A–D are actuated by a single movement of one of rotors 10. This economy of motion translates into low friction, low vibration, and a high power density.

Figure 5:
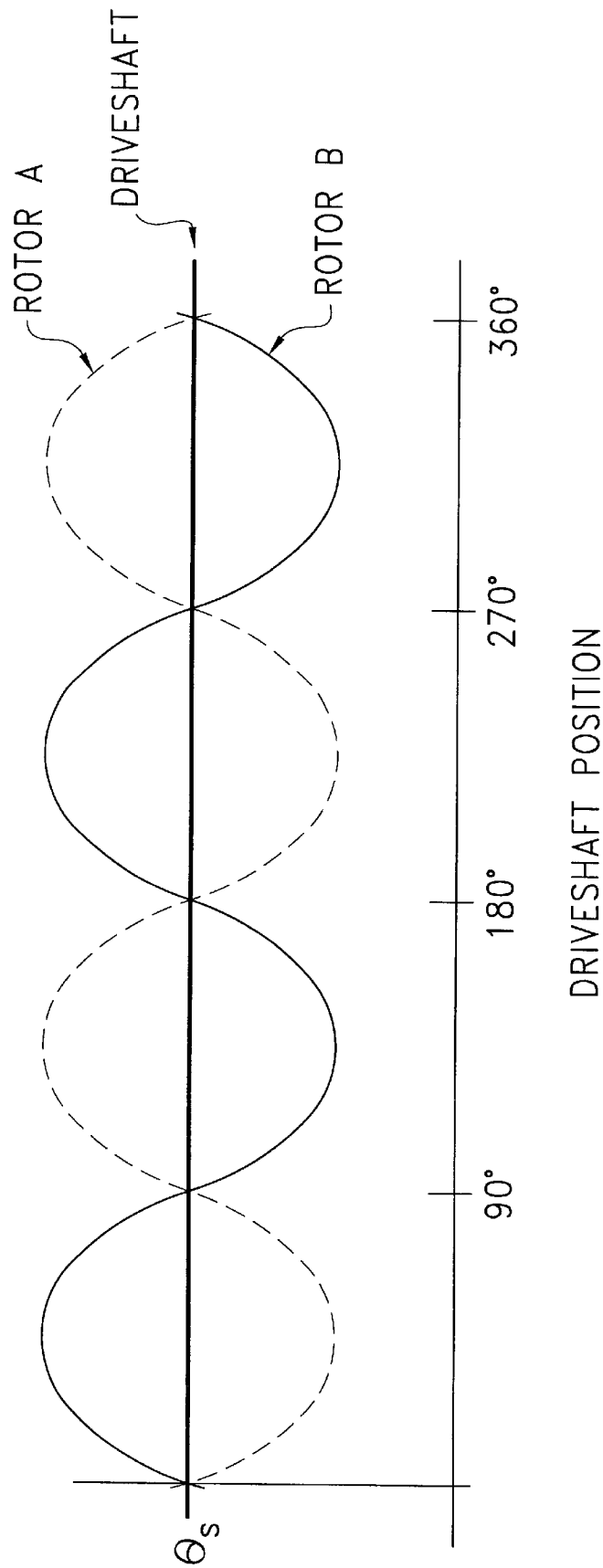
FIG. 5 is a graph of rotor speed versus driveshaft position, illustrating a variable rotor speed aspect of the present invention.

Driveshaft 204 to which rotors 10A, B are coupled spins at an angular velocity of $\dot{\theta}_S$. Rotor 10A has an average velocity of $\dot{\theta}_S$ also, but oscillates in a way that causes it to go faster than the driveshaft for awhile, and then slower than the driveshaft for awhile. Rotor 10B does the inverse, as illustrated in FIG. 5. In a preferred embodiment, the angular velocity of rotor 10A and rotor 10B may be made to vary sinusoidally according to the following equations:

$$\dot{\theta}_{RA}=\dot{\theta}_S+(1+\sin 2\theta_S) \quad (1)$$

$$\dot{\theta}_{RB}=\dot{\theta}_S+(1-\sin 2\theta_S) \quad (2)$$

Of course, the motion of rotors 10A, B with respect to one another need not be limited to a sinusoidal relationship if the chosen motion control device is capable of producing other motions.

1. Rotor Geometry

Figure 6:
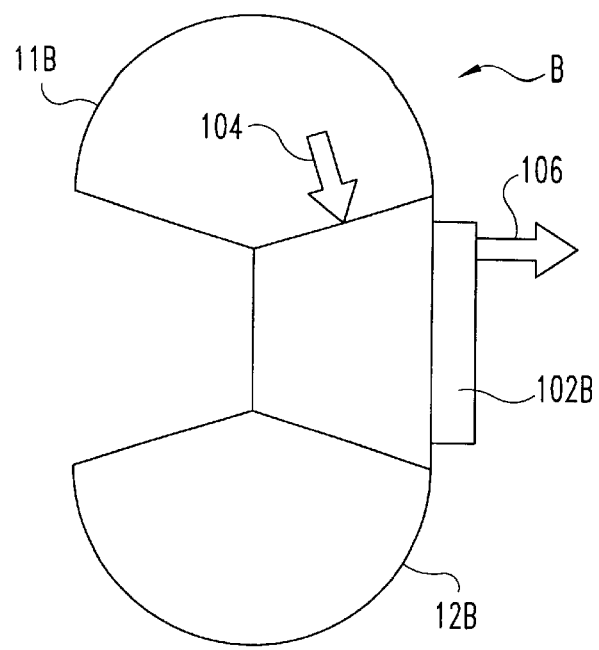
FIG. 6 is a side elevational view of a first embodiment rotor of the present invention.

As stated hereinabove, it is desired that rotor 10A and rotor 10B nest with one another in order to form the four combustion chambers 7A–D. A first embodiment rotor geometry of the present invention is illustrated in FIG. 6, wherein rotor 10B is shown in side elevation. Vanes 11B and 12B are coupled to a hub 102B that has a frustoconical shape. It will be appreciated by those having ordinary skill in the art that the shape of the vanes 11, 12 of each rotor 10A, B allow them to nest tightly with hub 102 of the opposite rotor 10B, A. One consequence of the frustoconical shape of hub 102B is that a force represented by the arrow 104 is placed upon hub 102 by the gases within each combustion chamber 7. This force 104 has a substantial horizontal component indicated by arrow 106, which tends to force hubs 102A, B away from one another during operation of rotary engine. This force can assist in sealing rotor hub joint 103.

Figure 7:
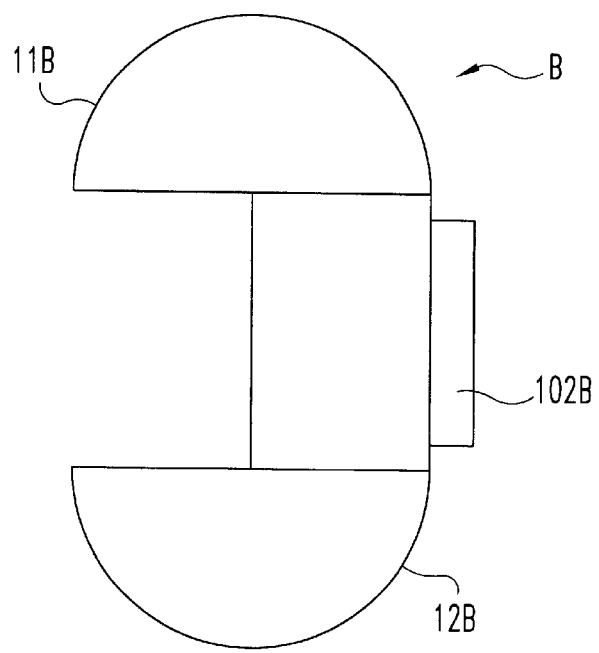
FIG. 7 is a side elevational view of a second embodiment rotor of the present invention.

An alternative design for rotors 10 is illustrated in FIG. 7, wherein the hub 102B has a cylindrical configuration with vanes 11B and 12B appended therefrom. The embodiment of FIG. 7 substantially eliminates any horizontal force component resulting from pressure of the combustion chamber gases against hub 102. Furthermore, the alternative design of FIG. 7 is less sensitive to the position of rotors 10 with respect to one another than is the frustoconical hub design of FIG. 6. This is because any horizontal displacement of rotor 10A away from rotor 10B in the design of FIG. 6 will result in a gap between the vanes 11, 12 of one rotor 10A, B and the hub 102 of the other rotor 10B, A. It can be seen that the rotor design of FIG. 7 does not suffer from this problem, in that horizontal displacement of one rotor 10A, B away from the other rotor 10B, A does not cause vanes 11, 12 to pull away from the hub 102 of the other rotor 10B, A.

2. Indexer Geometry

Figure 8:
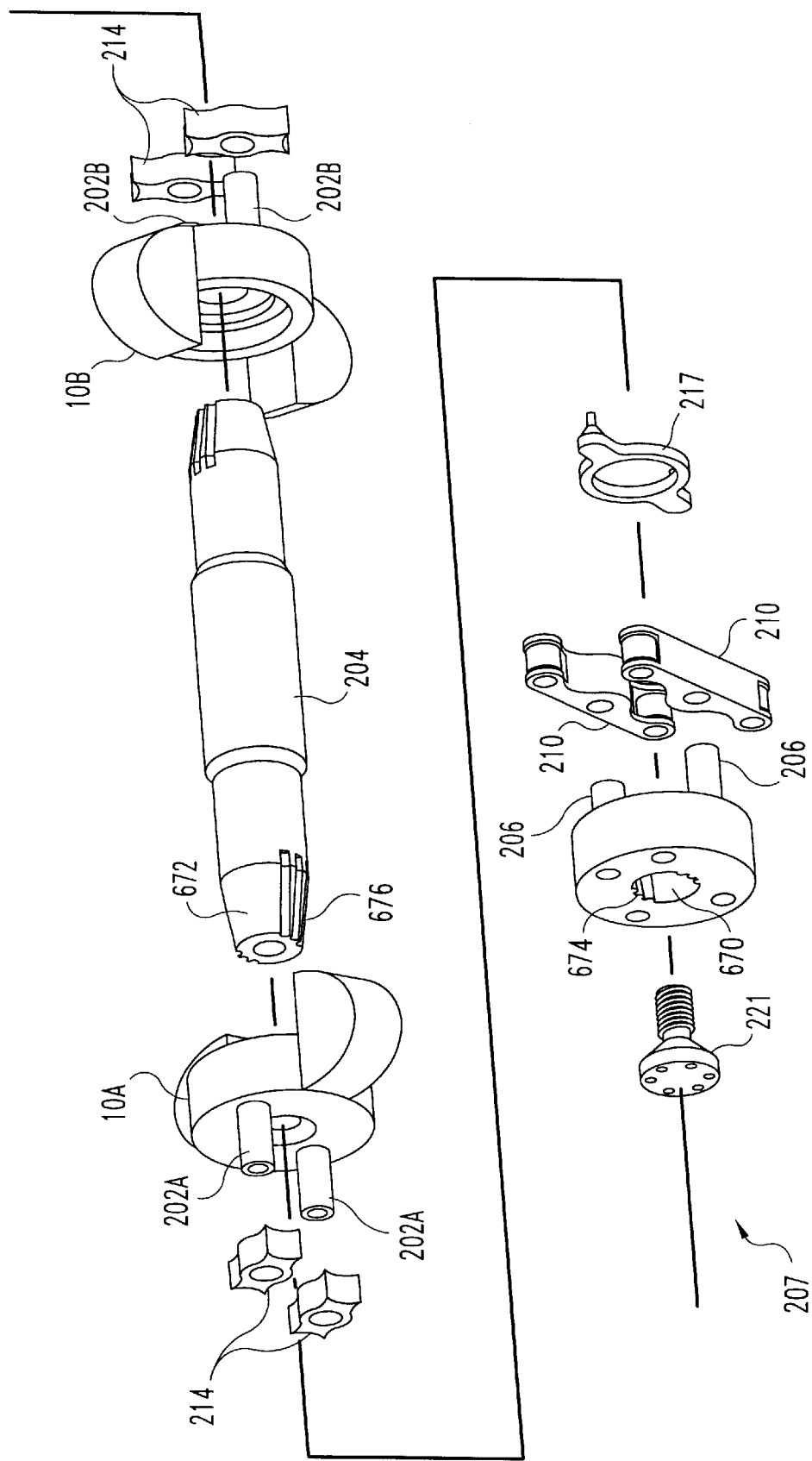
FIG. 8 is an exploded perspective view of the second embodiment rotor of the present invention mounted upon a driveshaft with a first preferred embodiment timing mechanism of the present invention.
Figure 9:
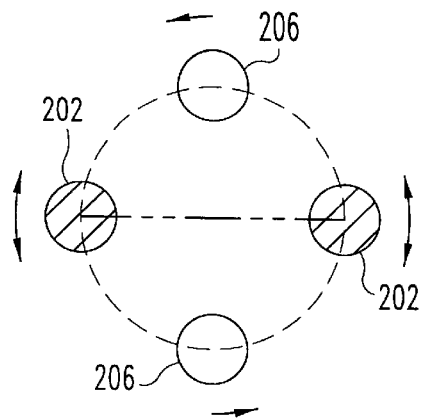
FIG. 9 is a schematic diagram of the angular relationship between rotor pins and drive flange 219 pins according to one embodiment of the present invention.

With reference to FIG. 8, rotors 10A, B will each have two drive pins 202A, B spaced 180 degrees apart and protruding from the back of rotors 10A, B. Secured firmly to driveshaft (crankshaft) 204 is a drive flange 219 that has two similar pins 206 spaced 180 degrees apart (FIG. 9). Pins 206 secured to driveshaft 204 will rotate at the same angular velocity as driveshaft 204. In this configuration, as driveshaft 204 is turned, the drive pins 206 will rotate through approximately 90 degrees before they strike rotor pins 202 and drive them at the same angular velocity as driveshaft 204. A power transmission mechanism 207 is therefore created, but a timing mechanism is still needed.

Figure 10:
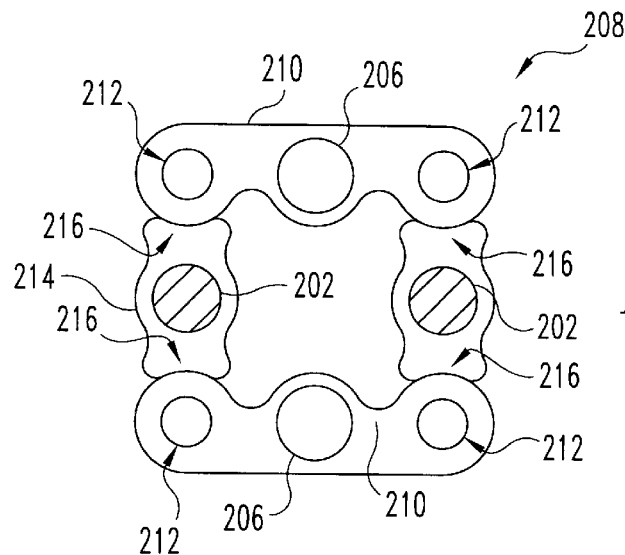
FIG. 10 is a plan view of a first preferred embodiment rotor position timing mechanism of the present invention, in a first position.
Figure 11:
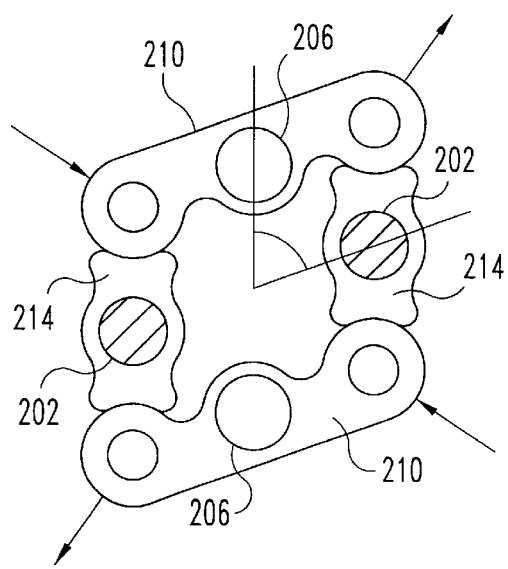
FIG. 11 is a plan view of the timing mechanism of FIG. 10 in a second position.

As shown in FIG. 10, with drive pins 206 and rotor pins 202 spaced at 90 ° degrees, four levers that pivot on these pins are added creating a parallelogram. In this case the levers have equal lengths and the parallelogram formed therefrom is a square. This linkage forms the basis of the timing mechanism 208. Two non-adjacent sides of the parallelogram are created by rocker levers 210 each carrying two rollers 212. The remaining sides are created by two spacer blocks 214 having saddle bearings 216 that ride on the curved surface of the rocker lever rollers 212. While rocker levers 210 and spacer blocks 214 are not of equal lengths, the sides of the parallelogram formed therefrom are of equal length. Timing mechanism 208 thus comprises a four bar linkage with idler rollers 212 at each corner of the parallelogram (in this case, a square). In FIG. 11, it can be seen that if two non-adjacent rollers 212 are squeezed toward the center, the remaining two rollers 212 will move apart. More importantly the angle between drive pins 206 and rotor pins 202 will change. Timing mechanism 208 allows rotors 10A, B to slow down and speed up relative to driveshaft 204, varying the volume in chambers 7A–D. The final component of this mechanism is a cam ring 211 that dictates the angular shift between drive pins 206 and rotor pins 202 by providing the appropriate "squeeze" to timing mechanism 208 as it rotates. This is described hereinbelow in section 11. The mechanism also includes an outer bearing 217, drive flange 219 and fastener 221.

3. Rotor Inner Seal

Figure 12:
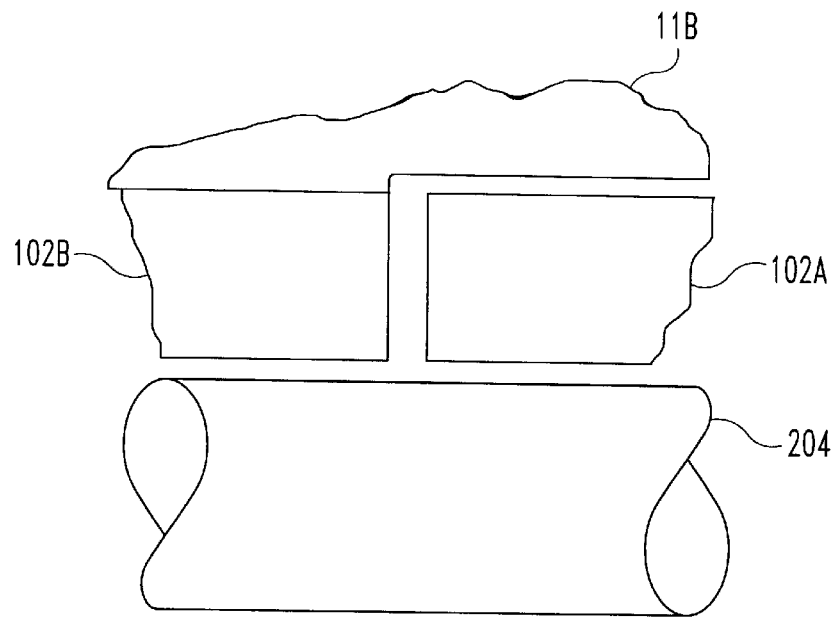
FIG. 12 is a partial cut-away view of a pair of second embodiment rotors nested on a driveshaft.

As shown in FIG. 12, rotary engine of the present invention will utilize two rotors nested about one another and fitted onto a driveshaft 204. Because combustion chambers 7A–D are defined by rotor wings 11 and 12, rotor hubs 102, and driveshaft 204, it is necessary to provide a seal that will prevent the contents of one combustion chamber 7 from migrating to an adjacent, lower pressure combustion chamber 7.

Because combustion chamber 7 volume is formed by two rotor hubs 102A, B meeting together, both of which are concentric to driveshaft 204, the seal must take into account both manufacturing tolerance variations and tolerance variations caused by wear over the life of engine 5. Provision must therefore be made to seal combustion chambers 7 with variable clearance.

Figure 13:
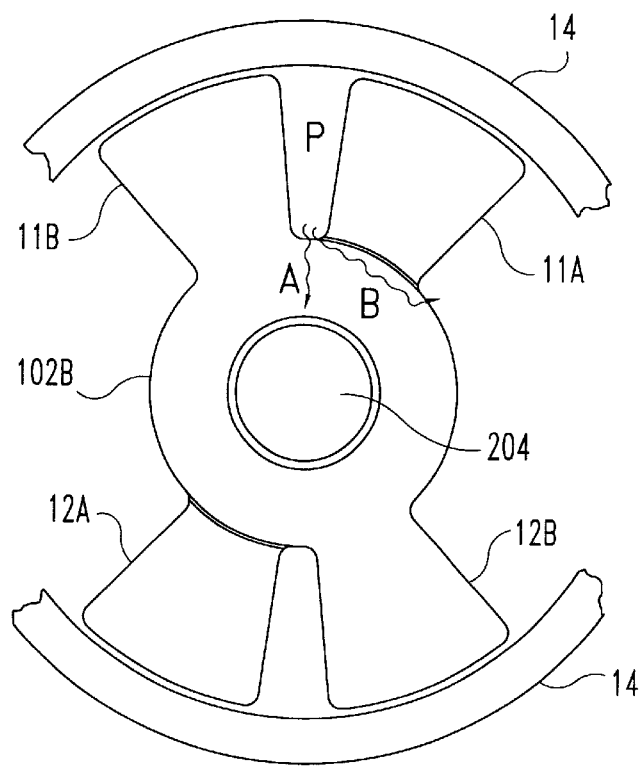
FIG. 13 is a cross-sectional view of the arrangement of FIG. 12.

With reference to FIG. 13, it can be seen that there are two possible leakage paths for gases to escape from combustion chamber 7. Path "A" is inward toward driveshaft 204, while path "B" is circumferential toward adjacent low-pressure chambers 7. Any viable seal design should deal with these two leakage paths and also cope with the variation in rotor-to-rotor hub clearance.

Figure 14:
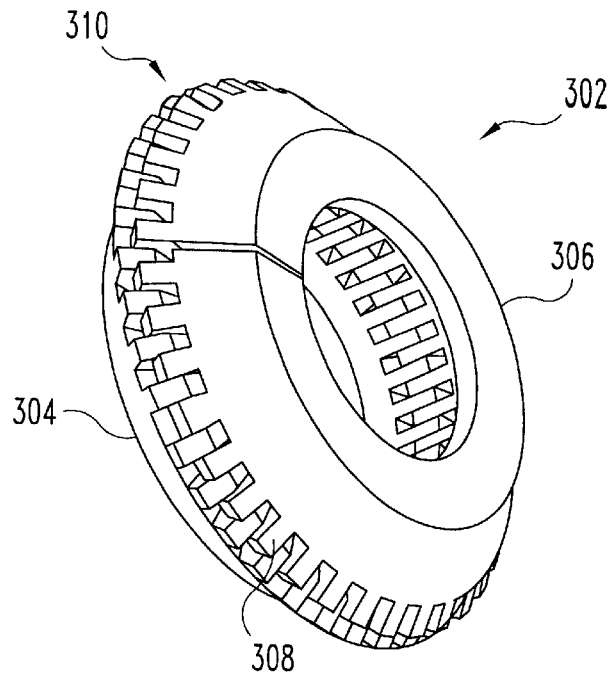
FIG. 14 is a perspective view of a preferred embodiment rotor inner seal of the present invention.

A preferred embodiment rotor inner seal is illustrated in FIG. 14 and indicated generally at 302. Rotor inner seal 302 is formed from two identical halves 304 and 306. Each seal half 304, 306 includes a plurality of circumferential fingers 308 which mesh with the complimentary fingers 308 of the other seal half 306, 304.

Figure 15:
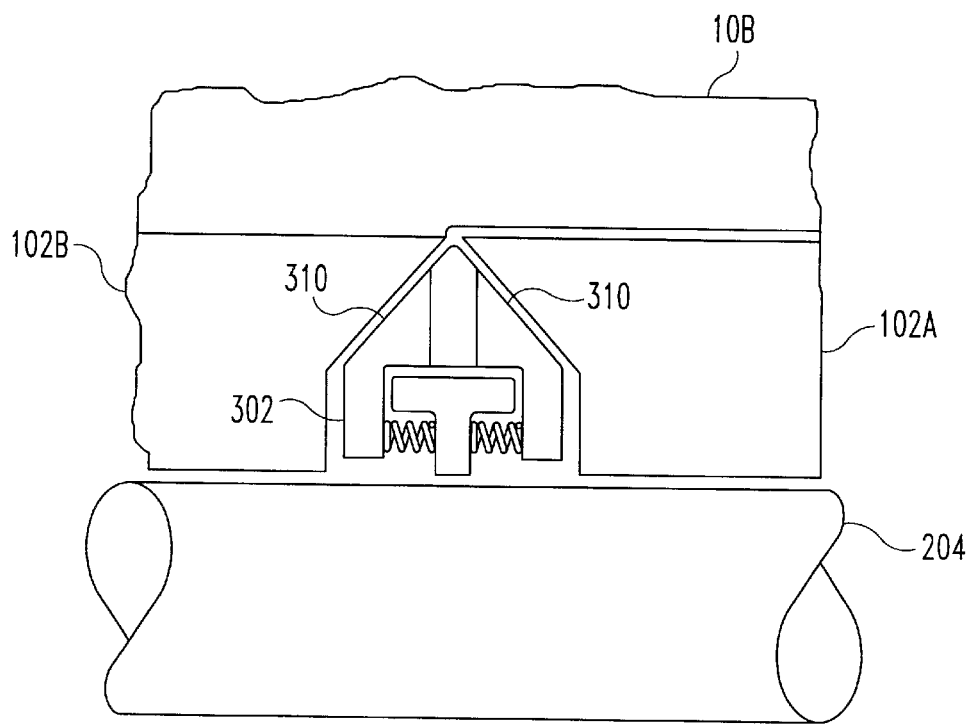
FIG. 15 is a partial cut-away view of rotor inner seal of FIG. 15 installed with the arrangement of FIG. 13.
Figure 16:
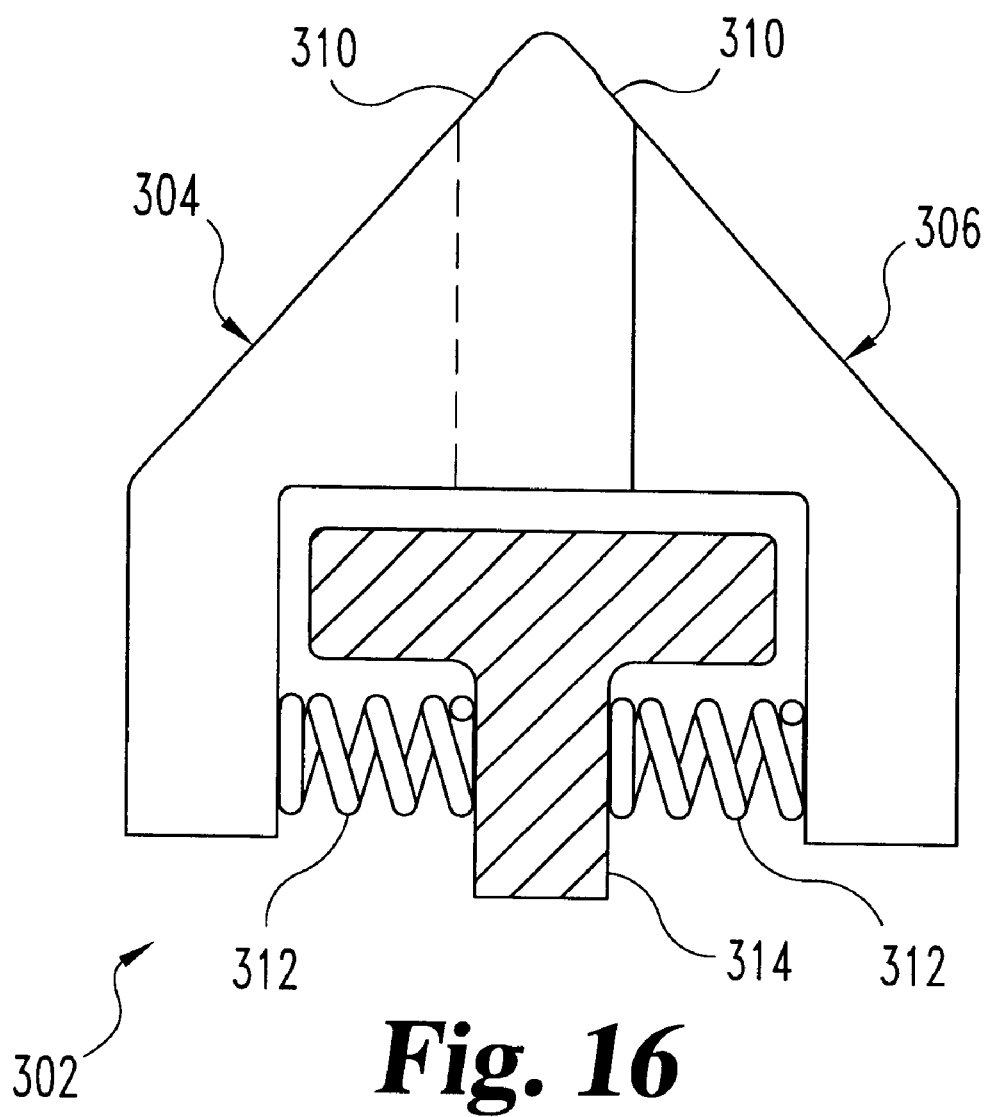
FIG. 16 is a cross-sectional view of a portion of rotor inner seal of FIG. 15.

The positioning of rotor inner seal 302 with respect to rotors 10A, B and with respect to driveshaft 204 is illustrated in FIG. 15. The periphery of rotor inner seal 302 is formed into a conical surface 310, which fits into a space between rotors 10A, B that is complimentary to the shape of rotor inner seal 302. As shown more clearly in FIG. 16, rotor inner seal halves 304, 306 are pressed against the inner surfaces of rotors 10 by means of internal springs 312 which bias the halves 304, 306 away from an internal ring 314. Springs 312 insure sealing at engine startup. Gas pressure loading of hubs 102 against rotor inner seal 302 augments this force during operation of engine 5. Those having ordinary skill in the art will recognize that other biasing means known in the art may be used to apply internal pressure to rotor inner seal 302 in place of helical springs 312.

4. Rotor outer Seal

Figure 17:
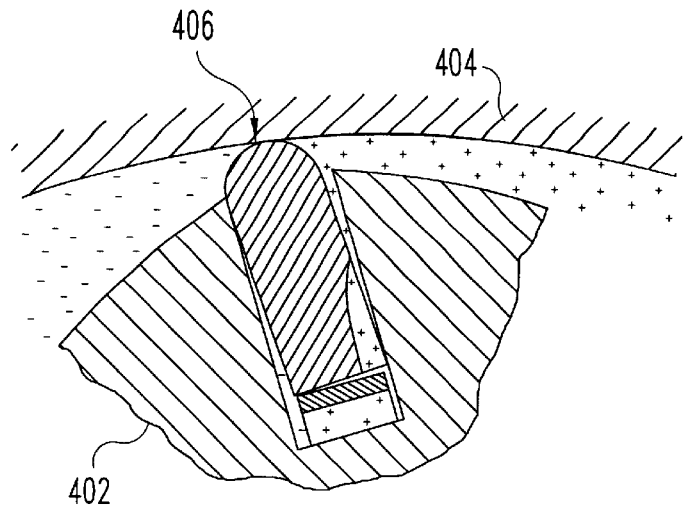
FIG. 17 is a schematic cross-sectional view of a prior art Wankel rotor and housing.
Figure 18:
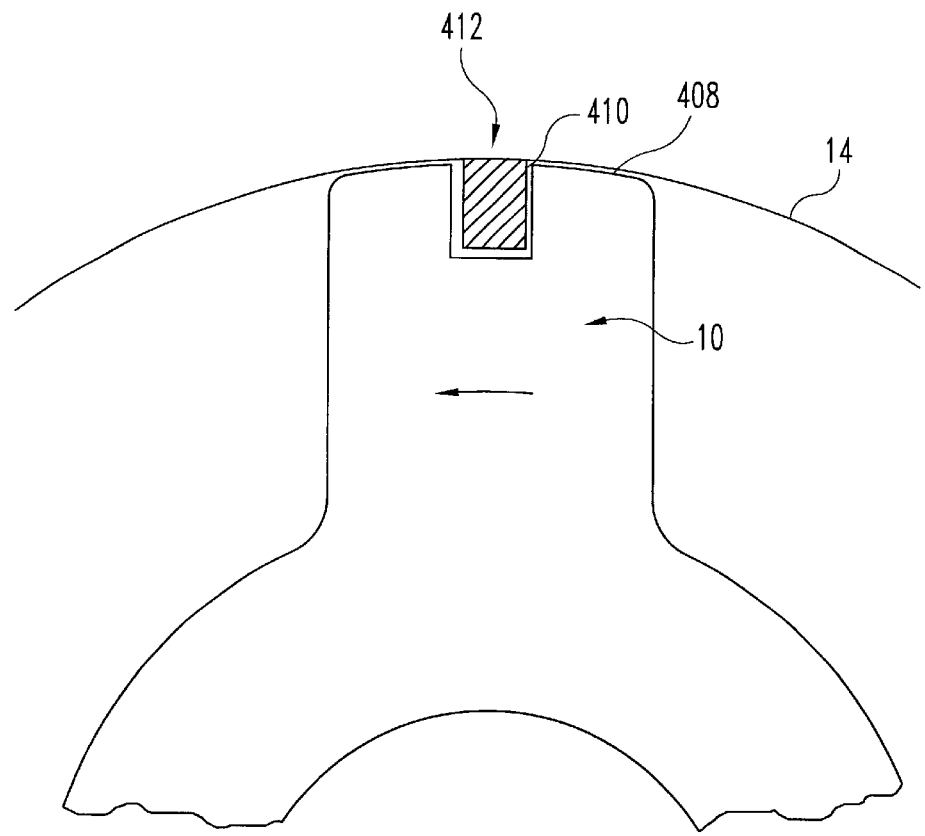
FIG. 18 is a schematic cross-sectional view of an "area contact" afforded by rotor outer seal of the present invention.

In addition to rotor inner seal 302, rotary engine of the present invention must also provide a seal between rotor vanes 11, 12 and the interior surface of housing 14. Rotary engine of the present invention offers superior sealing at rotor 10 periphery than other prior art rotary engines. One primary advantage of the present design is that the seal at rotor 10 periphery exhibits "area" contact, unlike the prior art Wankel engine, which exhibits "line" contact. A schematic cross-sectional view of the prior art Wankel rotor 402 within a housing 404 as illustrated in FIG. 17. Because of the peculiarities of the Wankel design, rotor 402 rocks back and forth within housing 404, which only allows a line contact area 406 between rotor 402 and housing 404.

In contrast, rotor 10 of the present invention exhibits an outer surface 408 which generally conforms to the shape of the interior of housing 14. Furthermore, rotor 10 spins upon a (relatively) fixed axis (the centerline of driveshaft 204). These factors make it possible to provide a rotor outer seal 410 which has a relatively wide contact area 412 with the inner surface of housing 14, which lowers unit pressure loading to reduce wear. Furthermore, this periphery seal 410 always exhibits forward motion relative to the wall of chamber 7. Conventional crank slider engine seals experience a zero velocity condition called "ring reversal," which causes the lubrication layer between the seal and chamber 7 surface to disappear. This creates a high wear region (i.e. top ring "turnaround" wear). The present rotary engine design will not experience this type of seal and/or chamber wall degradation, since seals 410 always have a forward velocity that promotes hydrodynamic lubrication.

Figure 19:
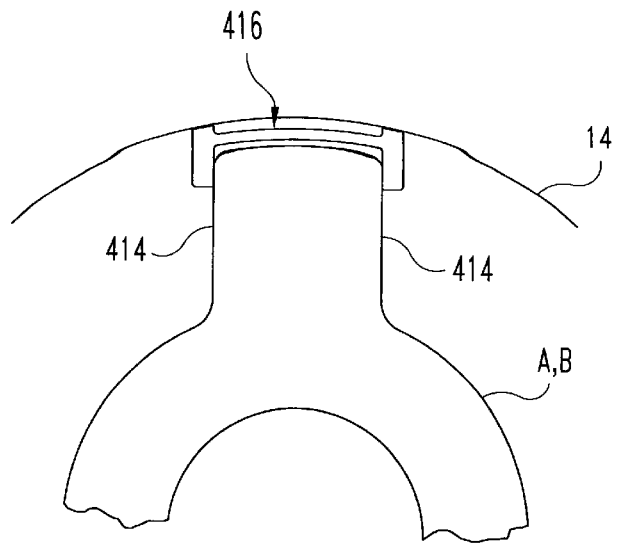
FIG. 19 is a schematic cross-sectional view of a preferred embodiment rotor outer seal of the present invention.

It is desirable to minimize the "crevice volume" in a combustion chamber 7. With reference to FIG. 19, the preferred embodiment rotor outer seal design of the present invention resolves this difficult problem by providing parallel seal mounting surfaces 414 on rotor 10, then establishing a "shoe" seal configuration 416 that slides over these parallel surfaces 414.

Figure 20:
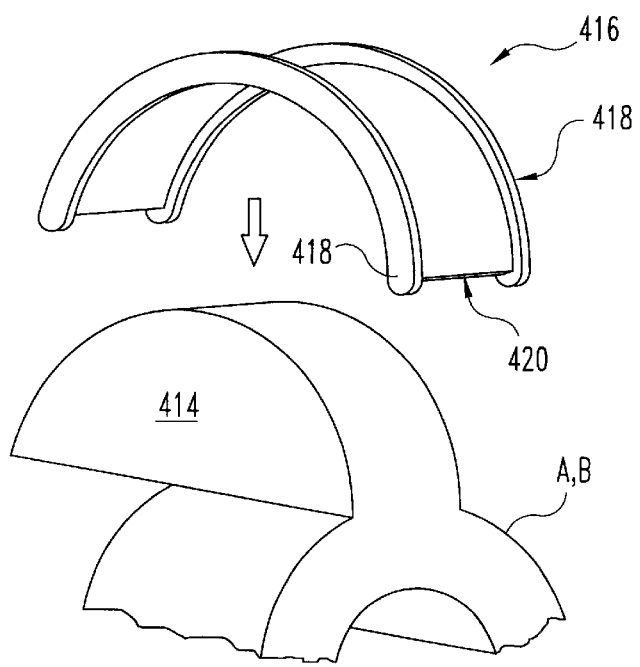
FIG. 20 is an exploded perspective view of a preferred embodiment rotor and rotor outer seal of the present invention.

Rotor 10 and rotor outer seal 410 are illustrated in an exploded perspective view in FIG. 20. In a preferred embodiment of the present invention, rotor outer seal 410 comprises two seal rails 418 connected by a web 420. Rails 418 follow the circumferential contours of web 420, but are formed to extend perpendicular to web 420 top and bottom surfaces, such that rails 418 extend away from web 420 in the direction of rotor 10 so as to provide a surface to mount onto parallel surfaces 414 of rotor 10. Rails 418 further extend from web 420 in a direction away from rotor 10 in order to provide seal surfaces 418 which wipe the inner wall of housing 14. In a preferred embodiment, the rail outer contact surfaces 418 are formed from an appropriate wear resistant coating and web 420 is formed from metal, such as steel or aluminum. Outer seal 410 can be manufactured in a variety of ways known in the art, including stamping, turning, P/M (powdered metal), casting, etc.

Figure 21:
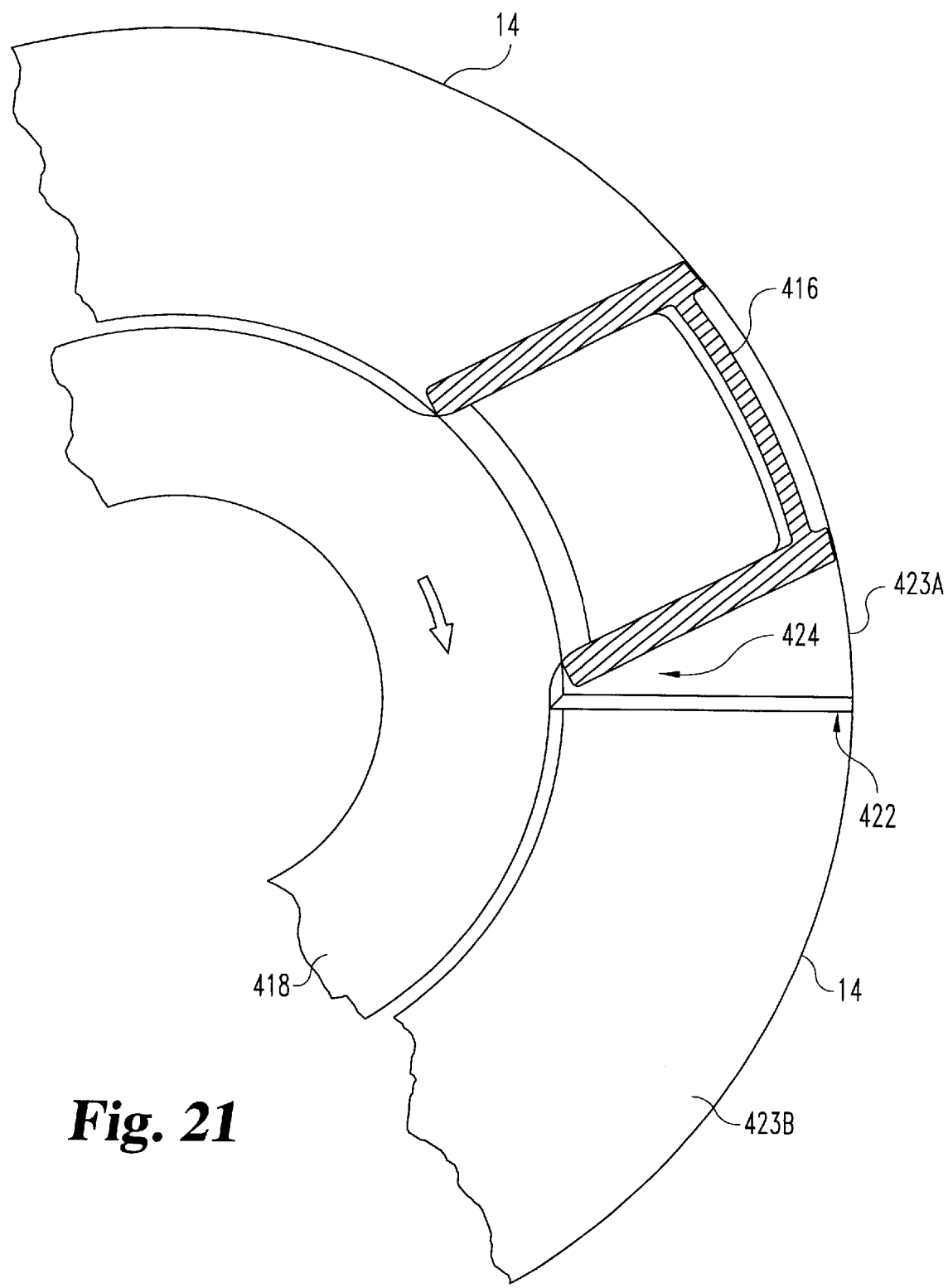
FIG. 21 is a schematic cross-sectional view of a "scissors action" exhibited by the preferred embodiment rotor outer seal of the present invention.

In one embodiment of the present invention, engine housing 14 is formed as a two-piece "clamshell" design. As illustrated in FIG. 21, the interface joint 422 between housing halves 423A, B must be traversed by rotor outer seal 410. Rotor outer seal 410 crosses interface joint 422 using a "scissors action" as indicated at 424. This avoids damage to seal 410 and prevents the creation of audible clicking noise as seal 410 traverses the joint 422.

5. Outer Seal Counterbalance

Figure 22:
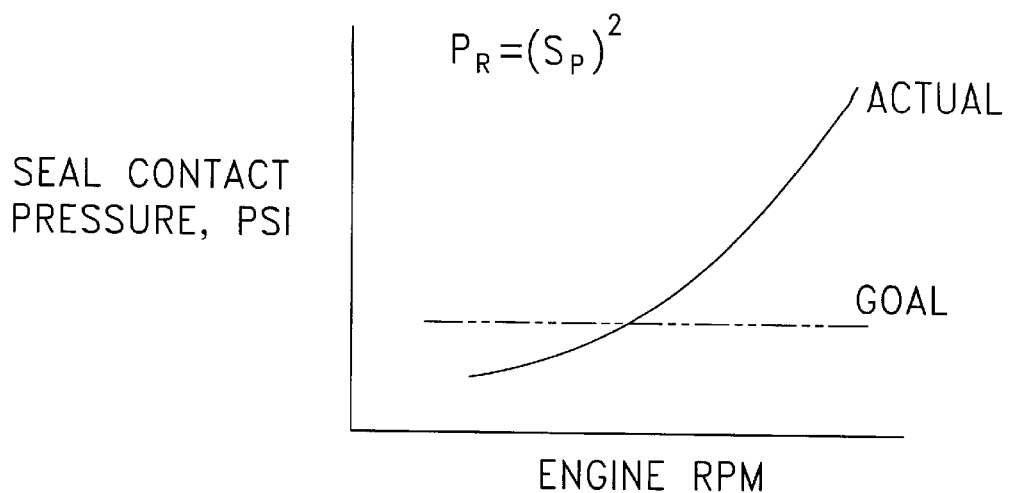
FIG. 22 is a graph of rotor outer seal contact pressure versus engine speed.

All rotary engines experience changes in peripheral seal contact pressure due to the centrifugal force of rotation. As illustrated in FIG. 22, the goal is to have a constant contact pressure between rotor outer seal 410 and the housing interior surface 501 independent of engine speed. However, as shown in FIG. 22, the actual outer seal contact pressure increases exponentially with increasing engine speed.

Figure 23:
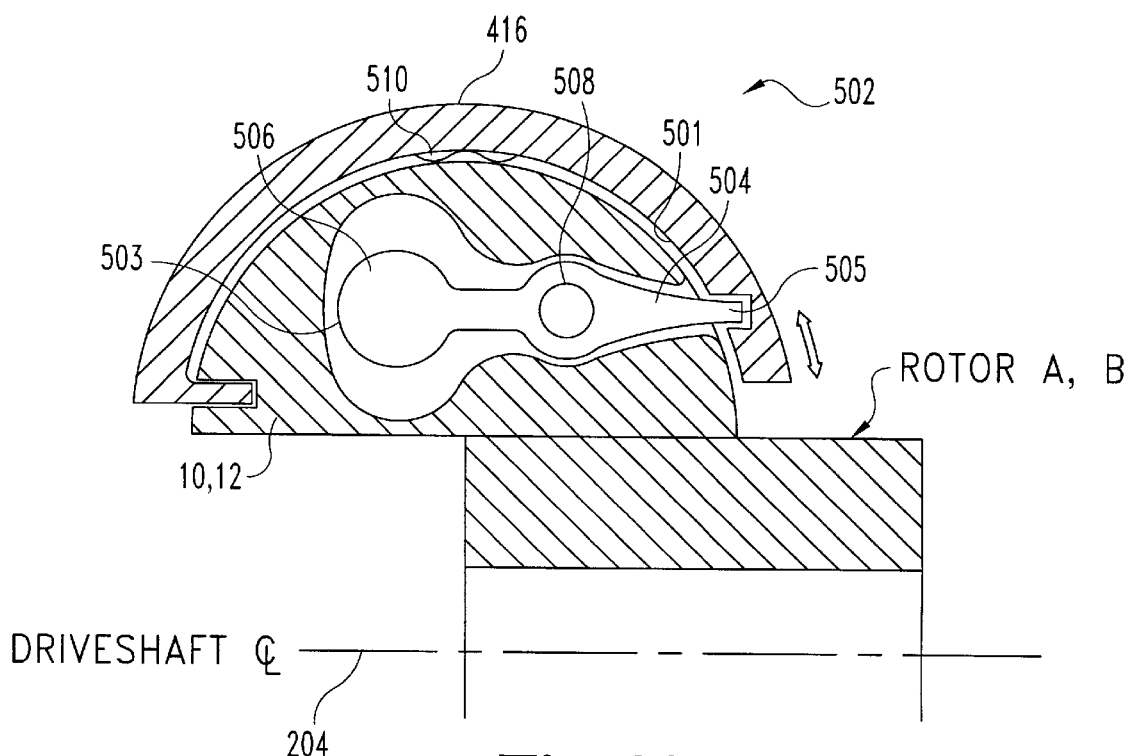
FIG. 23 is a cross-sectional view of a preferred embodiment rotor outer seal counterbalance mechanism of the present invention.
Figure 24A:
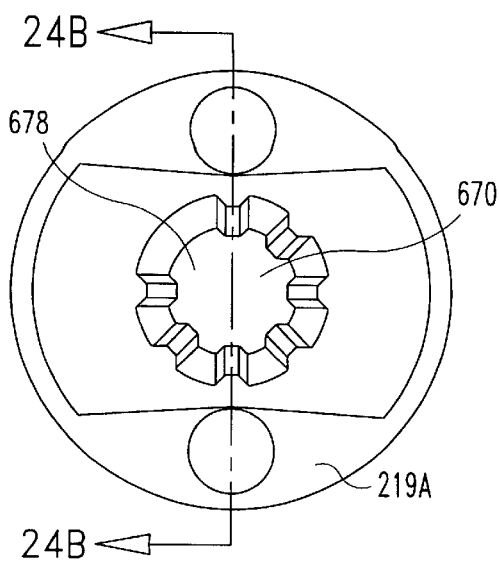
FIG. 24A is a front elevational view of a preferred embodiment front drive flange of the present invention.
Figure 24B:
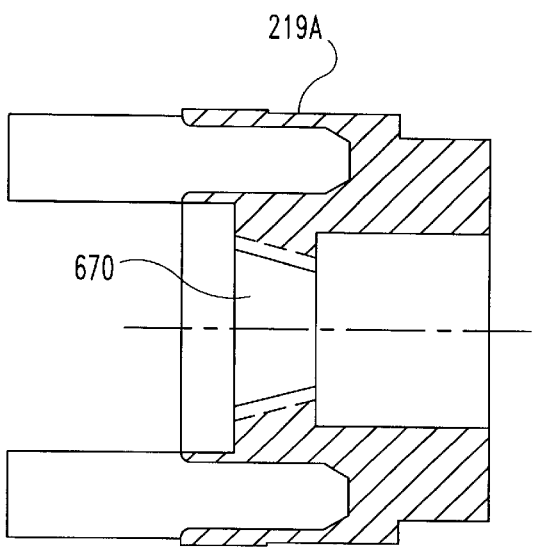
FIG. 24B is a side cross-sectional view of the front drive flange of FIG. 24A.
Figure 24C:
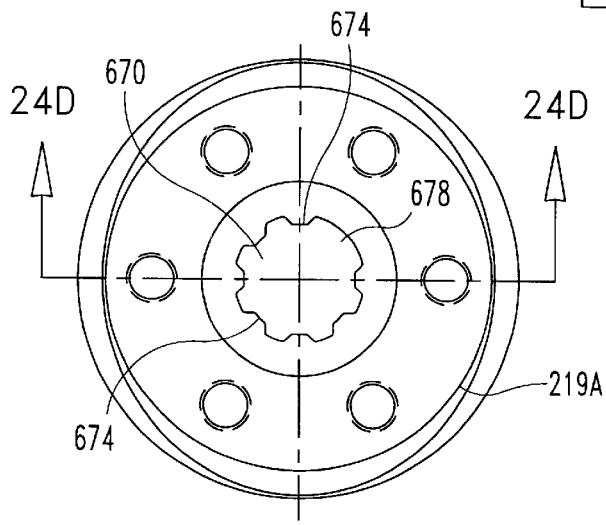
FIG. 24C is a rear elevational view of the front drive flange of FIG. 24A.
Figure 24D:
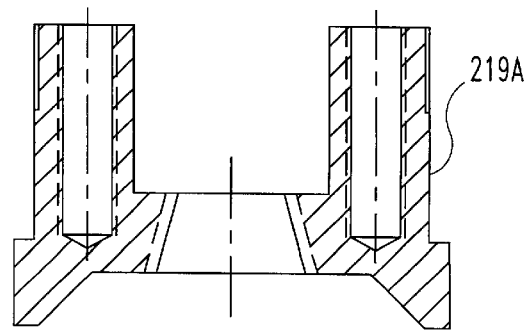
FIG. 24D is a top cross-sectional view of the front drive flange of FIG. 24A.
Figure 24E:
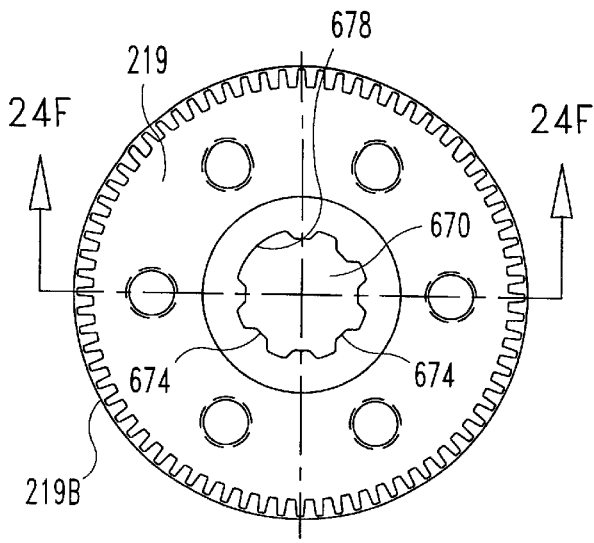
FIG. 24E is a rear elevational view of a preferred embodiment rear drive flange of the present invention.
Figure 24F:
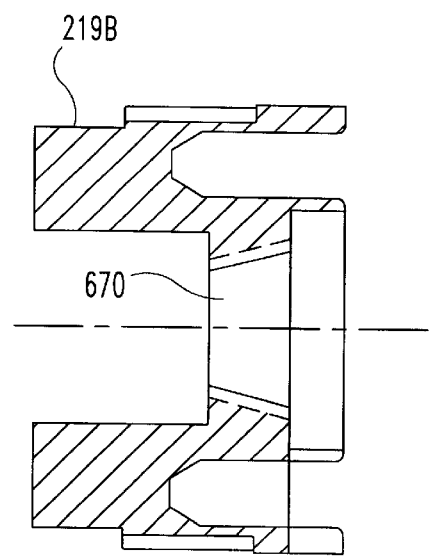
FIG. 24F is a side cross-sectional view of the rear drive flange of FIG. 24E.
Figure 24G:
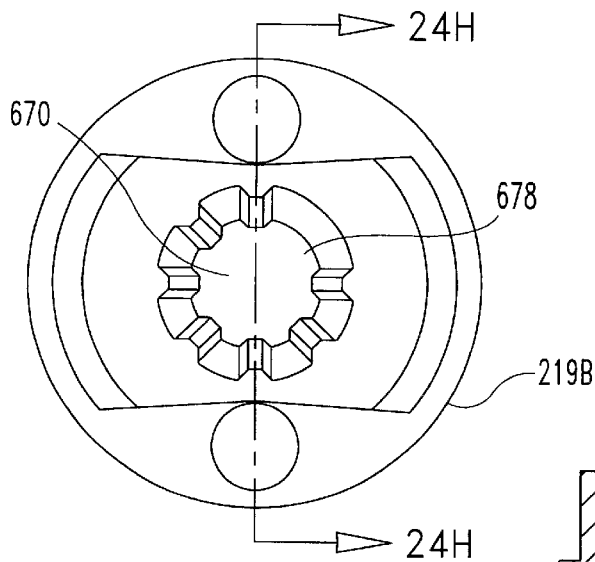
FIG. 24G is a front elevational view of the rear drive flange of FIG. 24E.
Figure 24H:
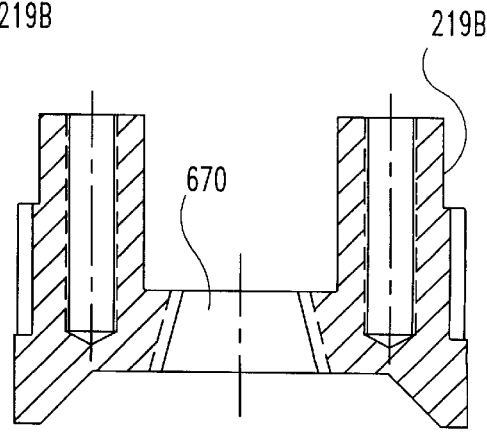
FIG. 24H is a top cross-sectional view of the rear drive flange of FIG. 24E.

The rotary engine of the present invention can utilize a counterbalance mechanism to negate the engine speed effect on seal contact pressure. A preferred embodiment of the counterbalance mechanism that is illustrated in FIG. 23, and indicated at 502. Counterbalance mechanism 502 places a shaft 504 into a space within rotor vane 11, 12. One end of shaft 504 carries a counterweight 506, while the other end 505 of shaft 504 is engaged with one end of seal 410. The opposite end of seal 410 is coupled to rotor 10 on the opposite side of vane 11, 12. Shaft 504 is allowed to pivot upon a fulcrum 508 between counterweight 506 and end 505.

In operation, rotation of rotor 10 causes centrifugal force to act upon counterweight 506, forcing counterweight 506 away from driveshaft 204. This, in turn, causes shaft 504 to pivot upon fulcrum 508, thereby driving end 505 of shaft 504 toward driveshaft 204. It can thus be seen that fulcrum 508 reverses counterweight 506 through the application of centrifugal force. This allows end 505 of shaft 504 to move seal 410 toward driveshaft 204, which is counter to the direction that centrifugal force is attempting to move seal 410. With proper tuning of the mass of counterweight 506 and the distances between counterweight 506, fulcrum 508 and end 505, the counterbalance mechanism 502 will "zero out" the centrifugal forces acting upon seal 410. Reducing or eliminating the centrifugal force helps seal 410 to experience much lower forces, and hence, reduces friction and increases the life of rotor outer seal 410, as well as increasing the efficiency of engine 5. Preferably, a bias spring 510 would be included to give seal 410 a constant contact pressure. Gas pressure would also act upon seal 410 in a way to increase unit loading of the seal contact.

6. Drive Flange Attachment

Because rotors 10 oscillate relative to each other as they rotate, drive flange 219 must transmit large, pulsating torques (see FIG. 8). Drive flange 219 must also provide for precise location, both axial and radial, relative to driveshaft 204. Additionally, driveshaft 204 must allow pressurized lubricant to pass from the center of driveshaft 204 to drive pins 206.

FIGS. 8 and 24A–24H illustrate one preferred drive flange 219 geometry for accomplishing the above-mentioned goals with a minimum of complexity and expense.

FIGS. 24A–24D illustrate views of a preferred front drive flange 219A, while FIGS. 24E–24H illustrate views of a preferred rear drive flange 219B. Preferably, drive flange 219 is fabricated from powder metal precursors by powder metallurgy techniques, although drive flange 219 may be formed through other known metallurgical fabrication techniques, such as casting and machining. Drive flange 219 includes a tapered central aperture 670 adapted to receive the tapered end 672 of driveshaft 204. The taper of central aperture 670 and driveshaft end 672 are matably matched, and are preferentially 10–30°. Central aperture 670 and driveshaft end 672 also include matable spline teeth 674, 676 (see FIG. 8) of a conventional geometry. Aperture spline teeth 674 and driveshaft spline teeth 676 are configured at the preferred taper angle, matching that of central aperture 670. One spline is omitted from drive flange 219 and from driveshaft 204 to provide a definite reference angle upon assembly, defining a single orientation in which drive flange 219 and driveshaft 204 may be assembled. Spline aperture 678 as defined by omitted spline teeth 674, 676 also provides an inlet for lubricant.

7. Bearing Configuration

Figure 25A:
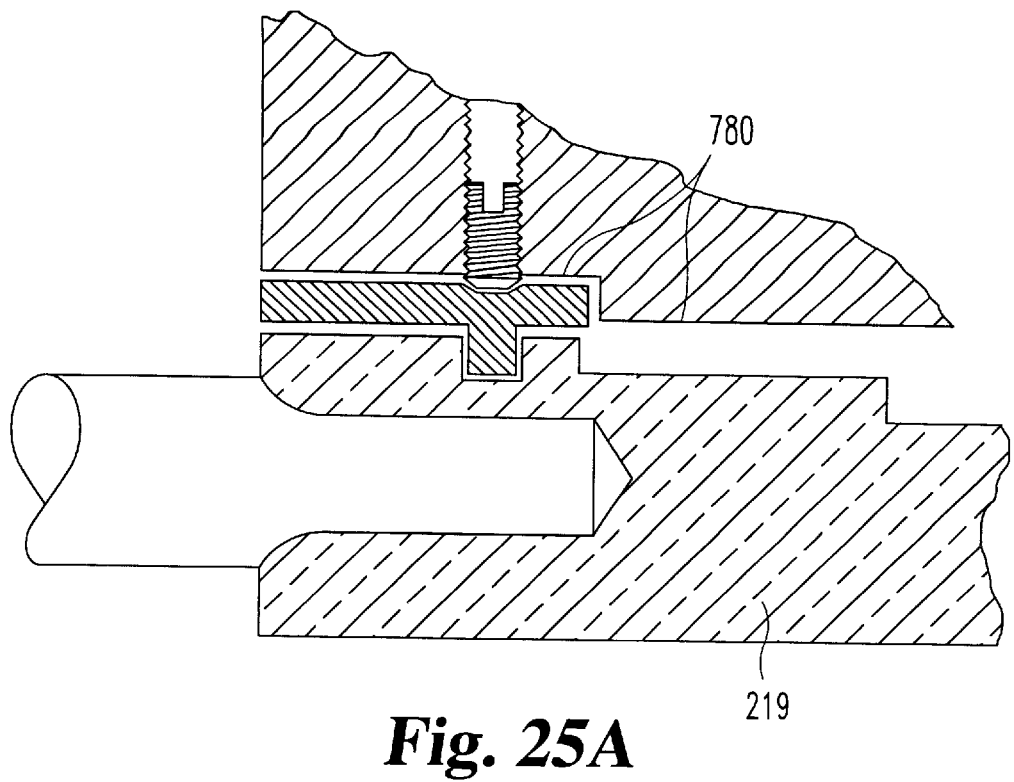
FIG. 25A is a partial side sectional view of the interface of the drive flange and bearing of the present invention.
Figure 25B:
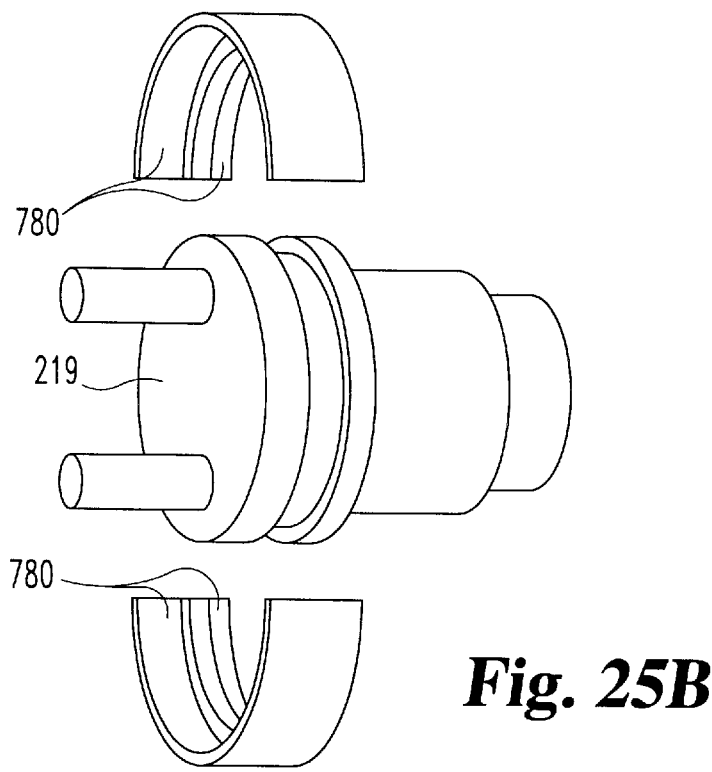
FIG. 25B is an exploded view of the interface of the drive flange and bearing of the present invention.

In addition to the functions discussed above, drive flange 219 is also configured to provide integral bearing surfaces 780. As is illustrated in FIGS. 25A and B, one such bearing surface 780 serves to provide both axial and radial support. Journal and thrust bearings are known to be very cost effective and have low friction when properly lubricated. In the preferred embodiment, integral bearing surface 780 has both journal and thrust characteristics, and is preferably formed from powder metallurgy precursors. Other embodiments are contemplated wherein bearing 780 has journal only, thrust only, or other combinations of bearing characteristics. Still other embodiments are contemplated in which the bearing 780 is formed through other convenient forming techniques and/or from other convenient precursors.

8. Exhaust Flange Geometry

Figure 26A:
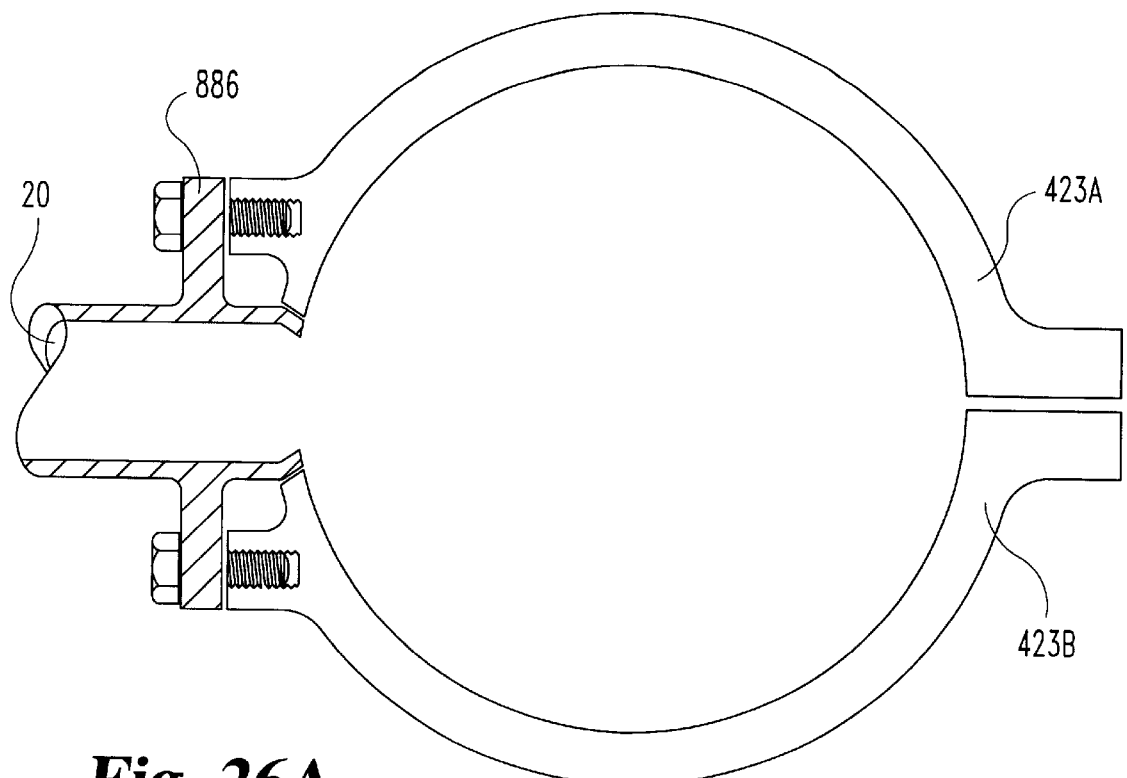
FIG. 26A is a side sectional view of the exhaust flange connection and housing of the present invention.
Figure 26B:
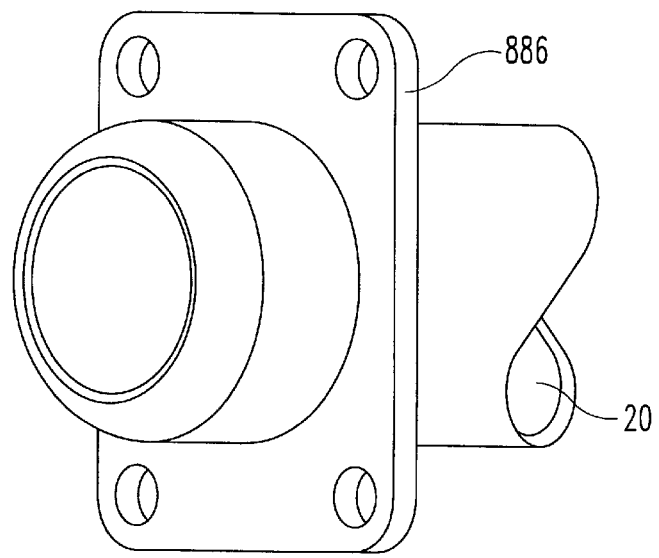
FIG. 26B is a perspective view of the exhaust flange connection of FIG. 26A.

In contrast to the multiple exhaust ports required by a crank slider engine, rotary engine configuration of the present invention requires a single exhaust port 20. As illustrated in FIGS. 26A and B, exhaust flange 886 connection is designed to take advantage of this requirement. Exhaust port 20 crosses the junction between upper housing 423A and lower housing 423B, with about half of exhaust port 20 in upper housing 423A and about half of exhaust port 20 in lower housing 423B. Preferably, exhaust port 20 has a very short length. Exhaust flange 886 connects using bolts oriented so as to minimize the wall area being contacted by the hot exhaust gas. A separation is arranged to further reduce the heat transfer from the hot exhaust gas back to housing 14. Alternatively, an insulating element may be installed in the void. Exhaust flange 886 is substantially symmetrical and as such may be connected in one of two reversible orientations, allowing flexibility during engine construction and/or installation.

9. Journal Bearing Configuration

Figure 27A:
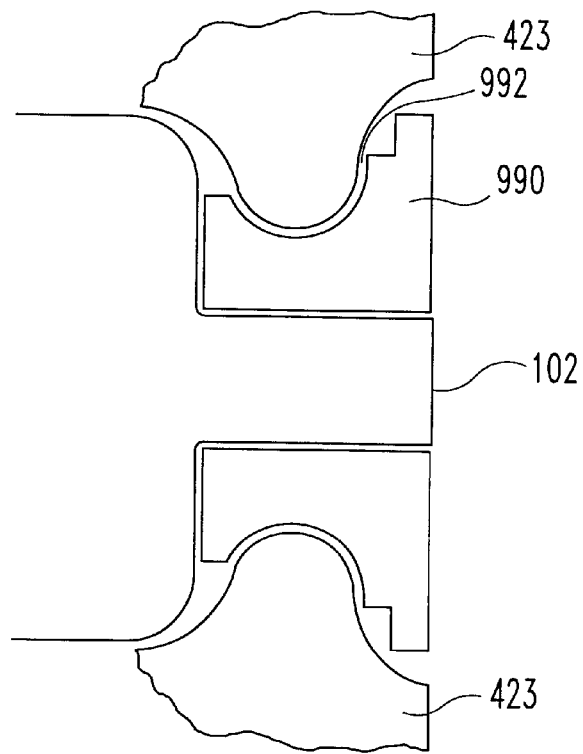
FIG. 27A is a top cross-sectional view of a preferred embodiment journal bearing of the present invention positioned between two housing halves.
Figure 27B:
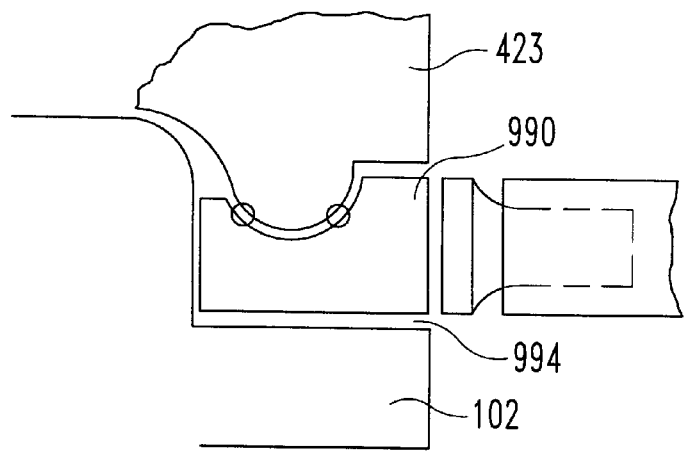
FIG. 27B is a side cross-sectional view of the journal bearing of FIG. 27A positioned between a housing halve and a rotor hub.

FIG. 27 illustrates a housing bearing 990 providing both radial and axial support at the junction of rotor hub 102 and housing halves 423A, B. Preferably, housing bearing 990 is unitary and is clamped tightly between housing halves 423A, B using a beveled seat 992. One of the benefits of this arrangement is that rotor hub 102 does not have to traverse a step at the junction of housing halves 423A, B, thereby avoiding premature wear. Another advantage is that a less complex bearing 990 can be provided at a lower cost. Housing bearing 990 is located positively and sealed positively by the V-profile (or a spherical profile) of housing halves 423A, B, avoiding leakage of combustion gasses. Additionally, an oil passage 994 is thereby formed allowing lubricant to fluidly communicate with rotors 10.

10. Peak Cylinder Pressure

Figure 28:
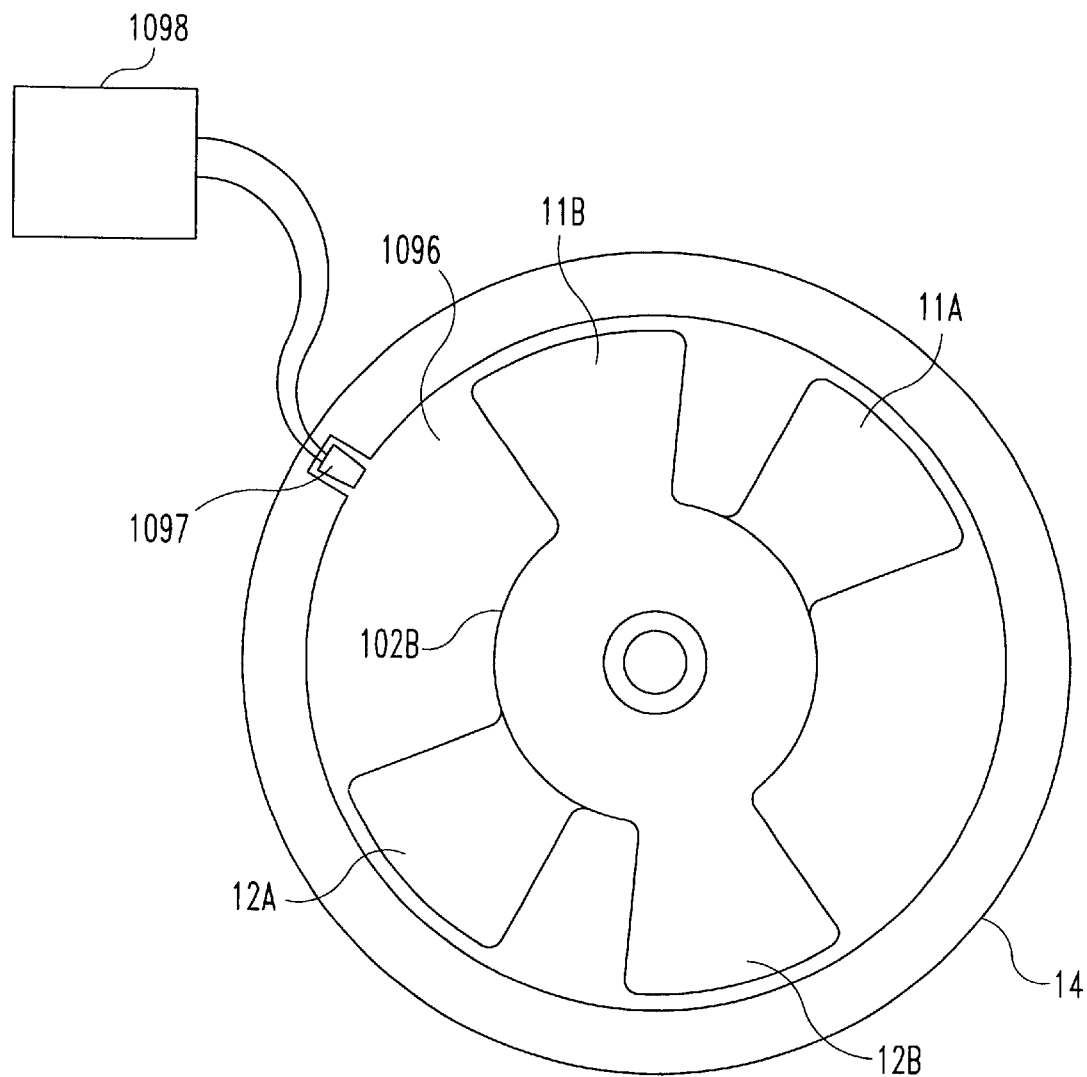
FIG. 28 is a cross-sectional schematic view of a preferred embodiment central combustion site of the engine of the present invention.

As illustrated in FIG. 28, the rotary engine configuration of the present invention provides one central location 1096 for combustion to occur. Central combustion site 1096 allows an economy to be realized for the placement of combustion-related equipment, such as spark plugs and injectors. This is advantageous, since not only are fewer such devices necessary for the operation of engine 5, but central combustion site 1096 also offers a central nexus for the placement of measurement devices 1097, such as temperature and gas pressure sensors. A gas pressure sensor 1097 installed at central combustion site 1096 may continually feed gas pressure data to an electronic controller 1098 to provide, for example, real time adjustment of the fuel injection process.

Electronic controller 1098 may use a continuous gas pressure signal to continuously vary the compression ratio of engine 5 during its operation. The ability to vary the compression ratio is known to provide important benefits in areas such as "cold start" compatibility, emissions reduction, fuel economy improvement, power increase, durability increase, and weight reduction. It is therefore possible to provide measurements of a variety of engine parameters taken at central combustion location 1096 to electronic controller 1098 to adjust compression ratio, air intake temperature, spark timing or other important variables to optimize combustion. In other words, feedback to electronic controller 1098 provides for real-time adjustment of any engine process related to combustion.

11. Rotatable Cam Rings

Figure 29A:
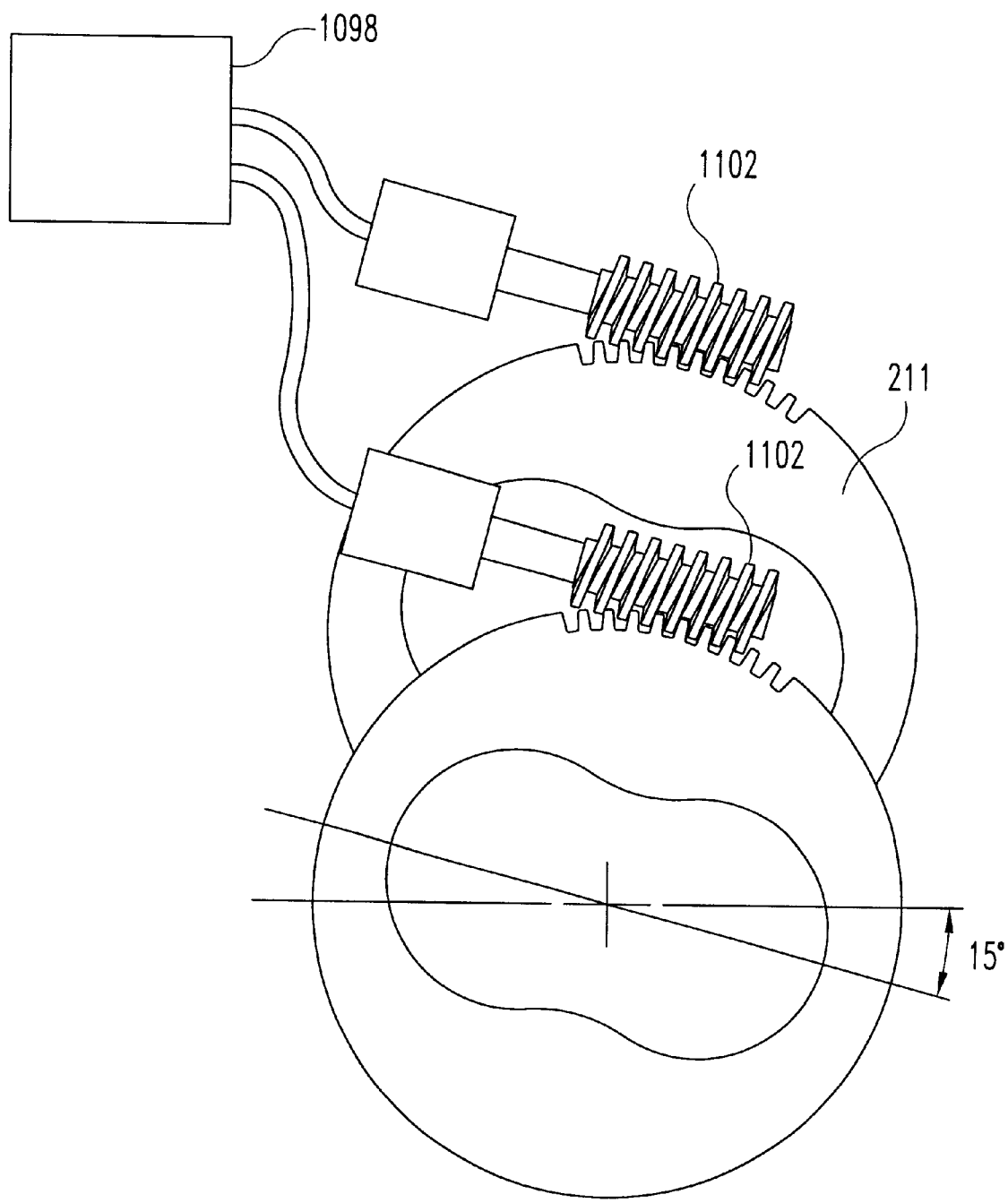
FIG. 29A is a schematic view of a preferred embodiment cam ring and cam ring actuator of the present invention.
Figure 29B:
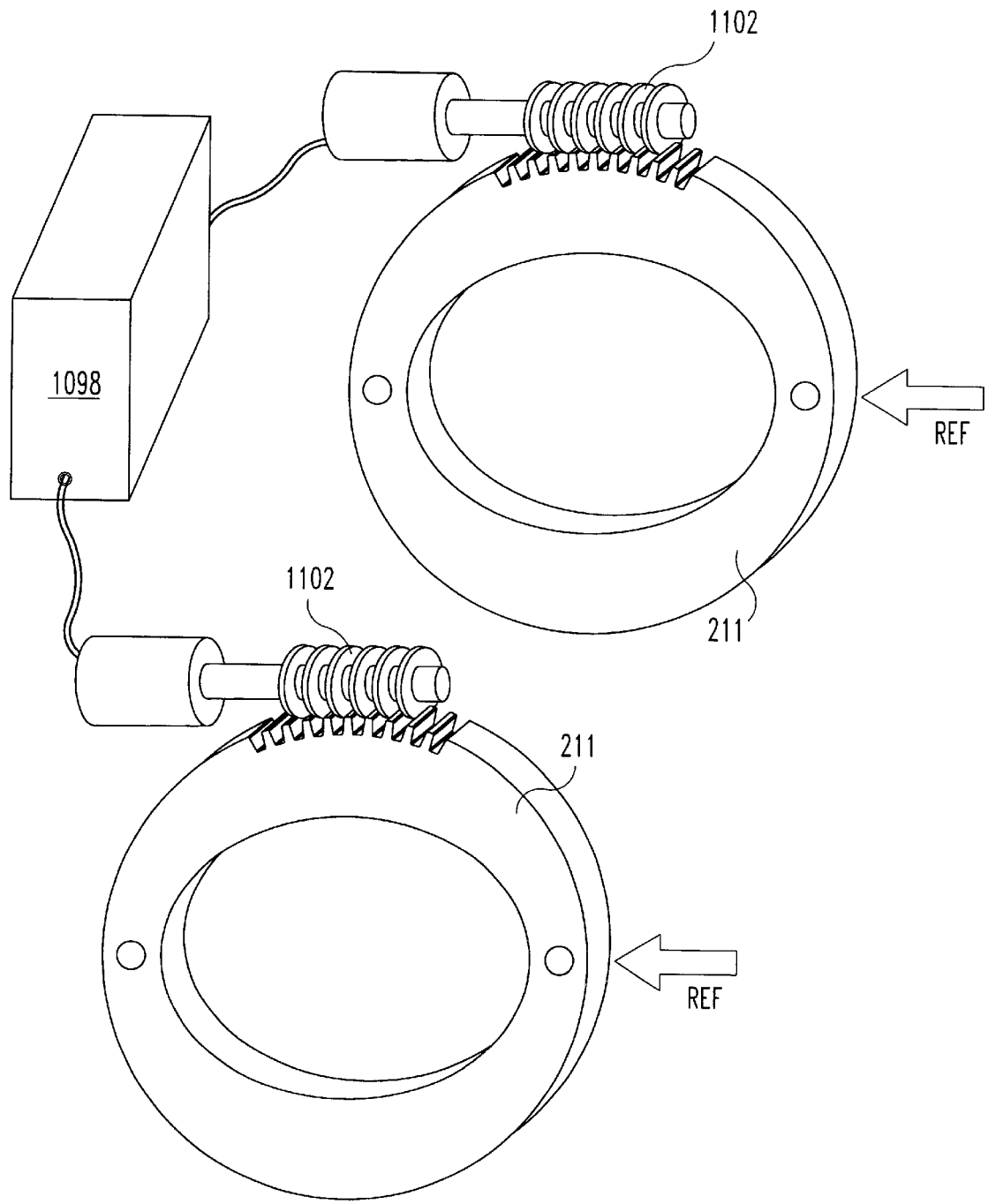
FIG. 29B is a first schematic view of the relationship between two rotatable cam rings of the present invention.
Figure 29C:
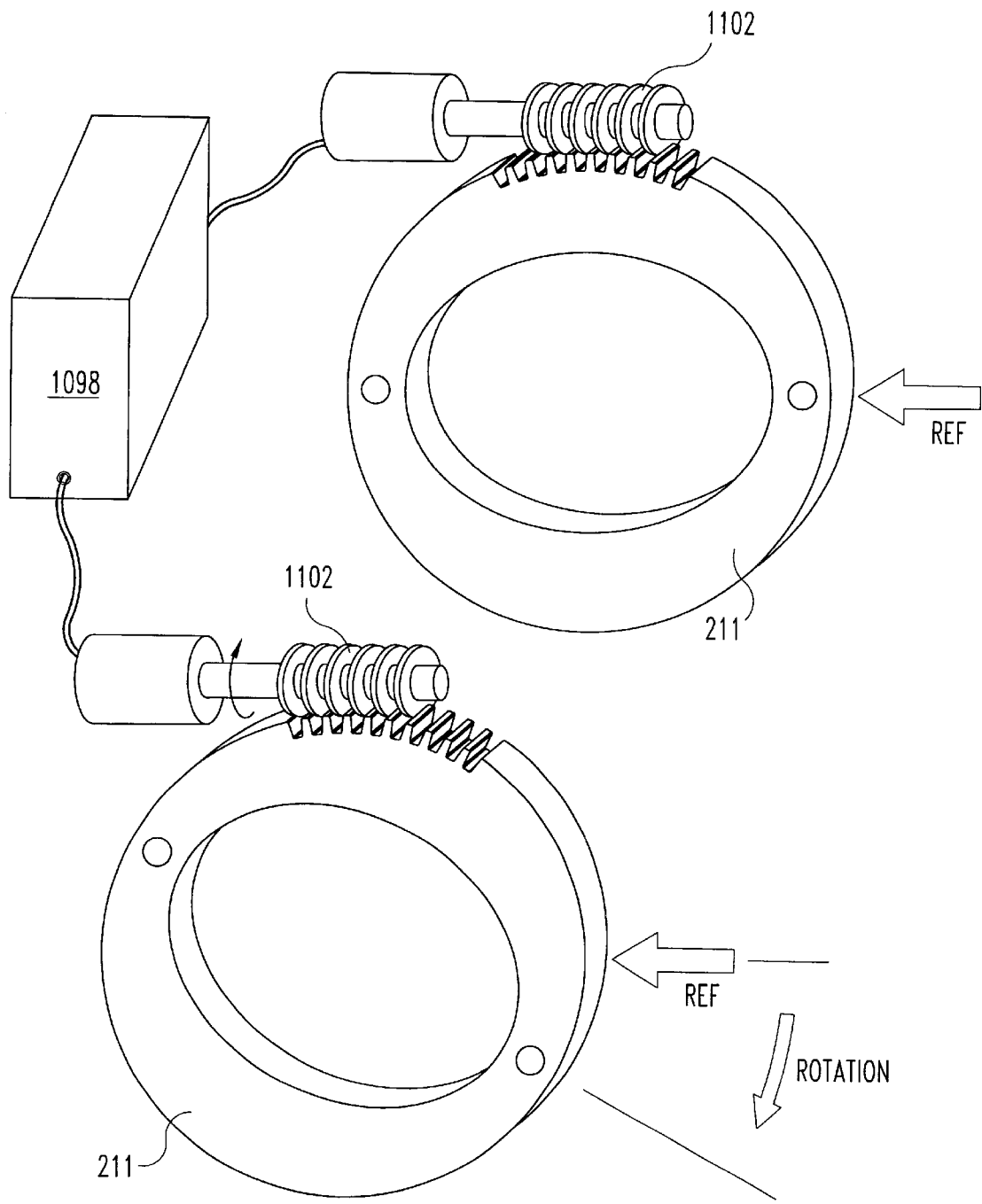
FIG. 29C is a second schematic view of the relationship between two rotatable cam rings of the present invention.
Figure 29D:
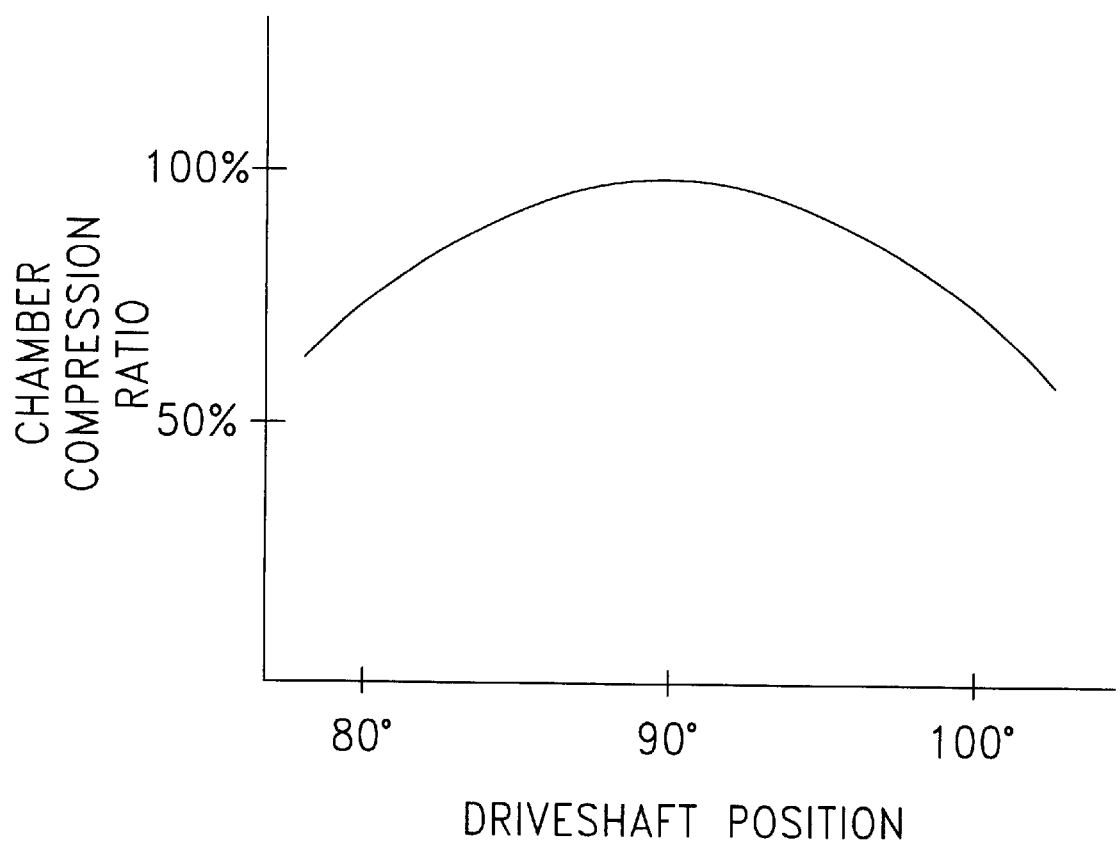
FIG. 29D is a chart plotting the cam phase angle as a function of chamber compression ratio.

A method of altering the compression, port timing and combustion timing ratio unique to this design is to rotate cam rings 211, as shown in FIG. 29A. Each cam ring 211 is operationally connected to a rotor 10 such that rotation of the cam ring 211 acts on the connected rotor 10 to change the angular relationship between the two rotors 10. By selectively rotating one or both cam rings 211, the mirror-image symmetrical relationship between the angular velocity of rotors 10 (as was shown in FIG. 5) may be altered. The mirror-image relationship between the angular velocity of rotors 10 holds only when cam rings 211 are positioned 90° out of phase relative to each other. When either cam ring 211 is rotated, rotor velocities are no longer completely opposed. FIGS. 29B and C show the new velocity relationship when one cam ring 211 is rotated several degrees relative to the other ring 211. The relationship between the cam ring orientation and the compression ratio is illustrated as FIG. 29D. It can be seen from FIGS. 29B and C that a rotation of one ring 211 several degrees relative to the other ring 211 has the effect of reducing the compression ratio, and that in fact the compression ratio is maximized when cam rings 211 are oriented 90° relative to each other.

By operationally arranging an actuating device 1102, such as an electric motor equipped with a worm drive, in connection with one or both cam rings 211, the desired cam rotation may be achieved. Referring back to FIG. 29A, one such arrangement is illustrated, wherein actuator device 1102 connected to electronic controller 1098 is operationally positioned to rotate cam ring 211. Actuating device 1102 allows individual phasing of rotors 10 through rotation of one or both of attached cam rings 211. Electronic controller 1098 may be provided with target compression ratio parameters that may be varied in response to operator inputs. The actual compression ratio is calculated by electronic controller 1098 using pressure input data from gas pressure sensor 1097 (see FIG. 28). Gas pressure sensor 1097 provides a continuous cylinder pressure signal to electronic controller 1098 for processing using logical algorithms. Electronic controller 1098 in response generates and sends a continuous or periodic signal to cam ring actuator 1102. A closed loop feedback arrangement is thus formed to yield fast and efficient combustion control.

If both cam rings 211 are thusly controlled, both cam rings 211 may be rotated in the same direction by the same moment. Rotation of both cam rings 211 in the same direction by the same moment results in a change in the timing of intake port 18, exhaust port 20 and combustion device 16. This capability is known to have important benefits in engine performance optimization; for example, late exhaust port 20 closing provides for the retention of exhaust gasses in combustion chamber 7. This is known as EGR (exhaustion gas retention) and reduces NOx emissions.

The above design yields three distinct advantages. First, a variable compression ratio may be obtained when rotors 10 are adjusted in opposing directions. Second, a variable intake charge flow (i.e. Miller cycle) may be obtained when taken toward the combustion site. Third, a variable EGR may be obtained when taken toward exhaust port 20.

Figure 30:
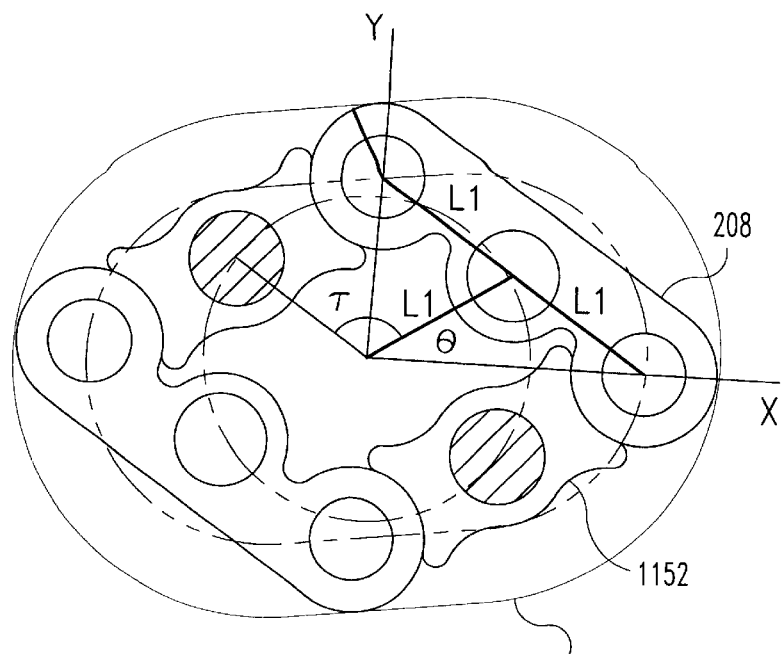
FIG. 30 is schematic diagram showing a preferred cam profile and roller center profile for a first preferred embodiment rotor position timing mechanism of FIG. 10.
Figure 31:
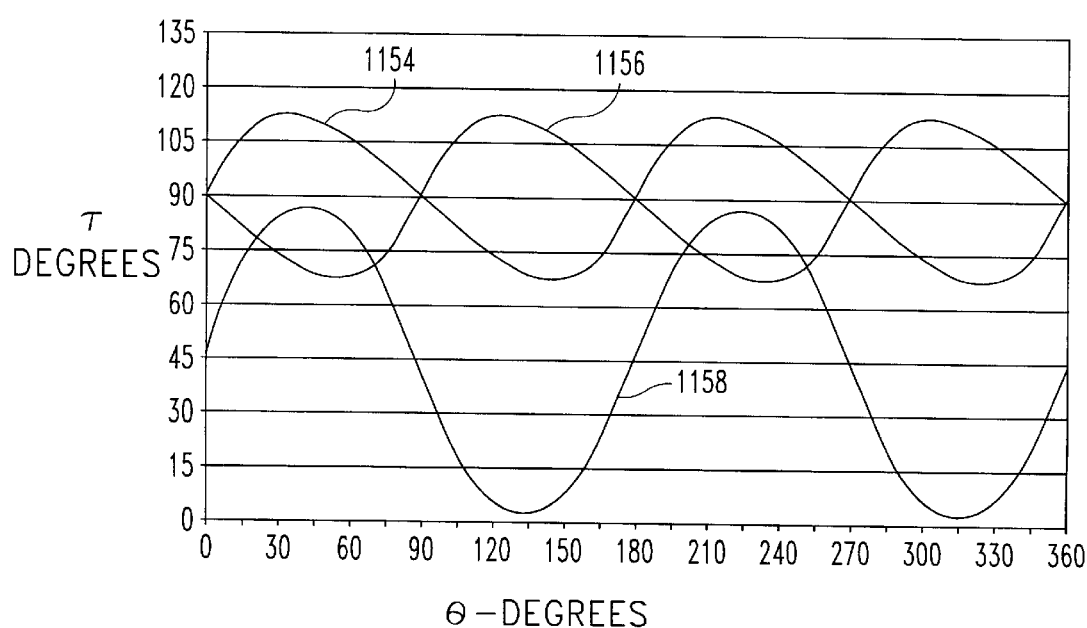
FIG. 31 is a graph of rotor phase angle and rotor separation angle versus driveshaft angle for the system of FIG. 30.

As discussed hereinabove in Section 2 (Indexer Geometry) and referring back to FIG. 8, a cam ring 211 may be used to dictate the angular shift between drive pins 206 and rotor pins 202 by providing the appropriate "squeeze" to timing mechanism 208 as it rotates. A typical cam profile 1150 is illustrated in FIG. 30. A cam ring 211 with an interior opening defining the cam profile 1150 will cause the roller centers of timing mechanism 208 to follow the indicated roller center profile 1152. Rotor motion generated by cam profile 1150 follows an asymmetric wave as described by $\tau(\theta)$ in FIG. 31, where T is rotor phase angle and $\theta$ is the driveshaft angle. $\tau(\theta)$ for rotor A is represented by curve 1154, while $\tau(\theta)$ for rotor B is represented by curve 1156.

Even though rotor phase angle functions 1154 and 1156 are asymmetric, it must be remembered that there are two rotors 10A, B that separate the working volumes of engine 5 of the present invention. Both of these rotors 10A, B are moving simultaneously to vary the respective volumes of chambers 7. The profiles for both cam surfaces 1150 may or may not be the same, but one cam 211 will be positioned 90 degrees out of phase in order to produce complimentary motion of rotors 10A, B. Therefore the chamber volume contained between rotors 10 will actually be the combination of the individual rotor motions. The angle between rotor faces, rotor separation angle, will be defined as $\beta$. An interesting outcome in the combination of these singular rotor motions is that, if a 90 degree phase exists between cams 211, the asymmetry of both singular profiles 1154 and 1156 can cancel, resulting in $\beta$ as a sinusoidal function of $\theta$. This is illustrated as the curve 1158 in FIG. 31.

Figure 32:
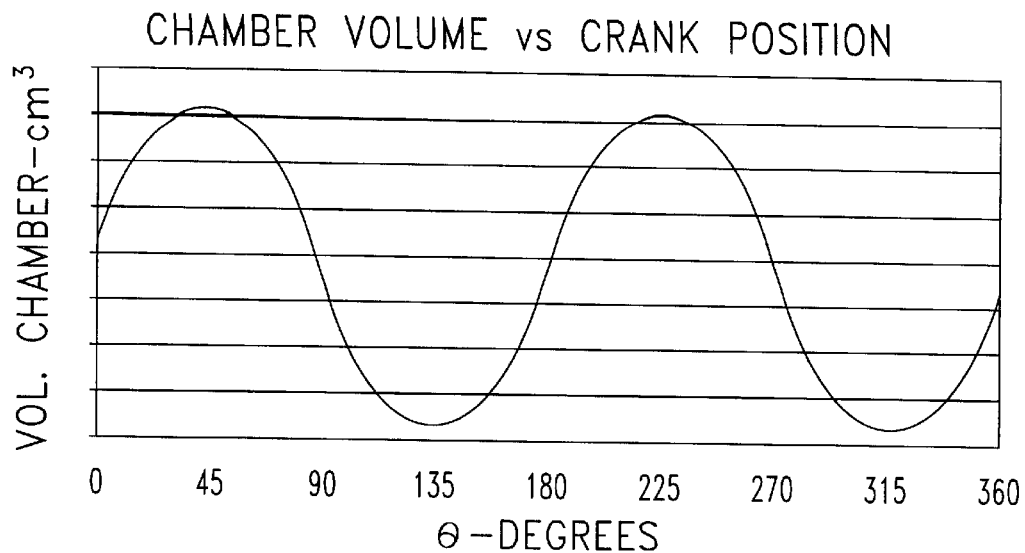
FIG. 32 is a graph of chamber volume versus driveshaft angle for the system of FIG. 30.
Figure 33:
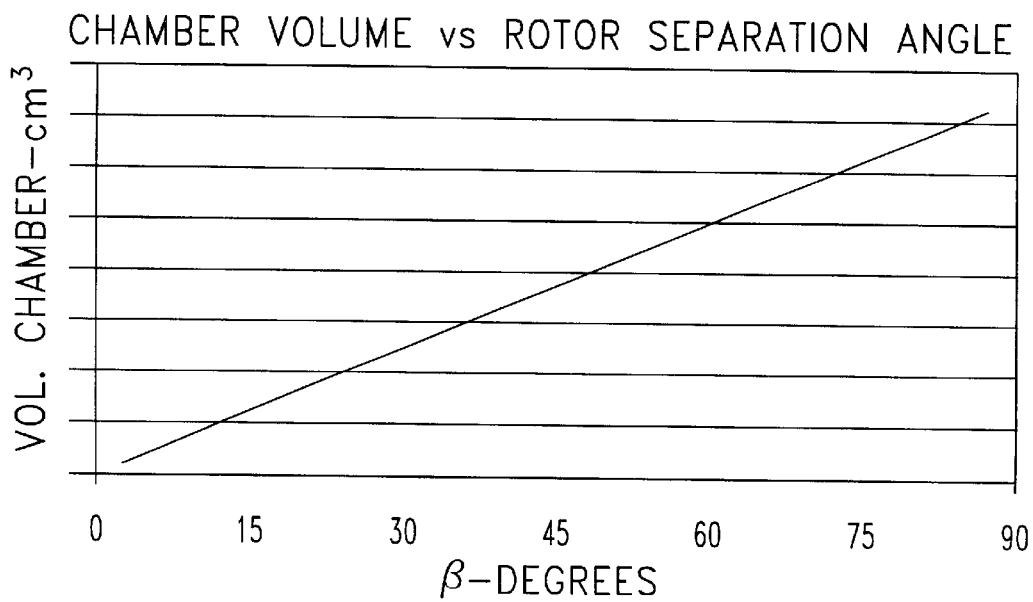
FIG. 33 is a graph of chamber volume versus rotor separation angle for the system of FIG. 30.

Using the rotor separation angle, $\beta$, the volume for a single chamber 7 as a function of crank angle can be determined using $$V = \pi \beta \int_{r_1}^{r_2} w(r) r \, dr \quad (11.1)$$

where r is the radial distance measured from driveshaft 204 center, and w(r) is the cross-sectional width of rotor 10 as a function of r. As a simplified case, the cross-sectional variation of rotor 10 can be assumed to be constant, drastically simplifying equation 11.1 to $$V = \pi \beta w |r^2/2|_{r_1}^{r_2} \quad (11.2)$$

where $r_1$ and $r_2$ represent the radial distance to the bottom and top of rotor 10. Using equation 11.2 and arbitrary values for the cross-sectional properties of rotor 10, a single chamber volume may be calculated as a function of either crank angle, $\theta$, or rotor separation angle, $\beta$. Plots of the volume as a function of both of these angles are shown in FIGS. 32 and 33, respectively. It can be seen from this cam profile example that the chamber volume changes sinusoidaly with respect to the crank angle. It can also be seen that the chamber volume can be directly proportional to the angle $\beta$. It can be assumed that a proportionality constant can be developed as a function of rotor cross-section and the distance of the cross-section from the center of the crank (driveshaft 204).

Figure 34:
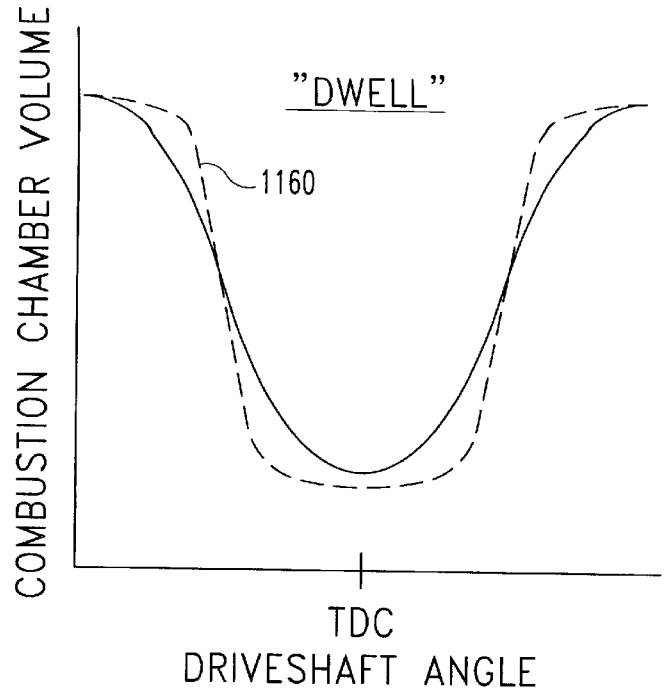
FIG. 34 is a graph of chamber volume versus driveshaft angle for a "dwell" cam profile of the present invention.
Figure 35:
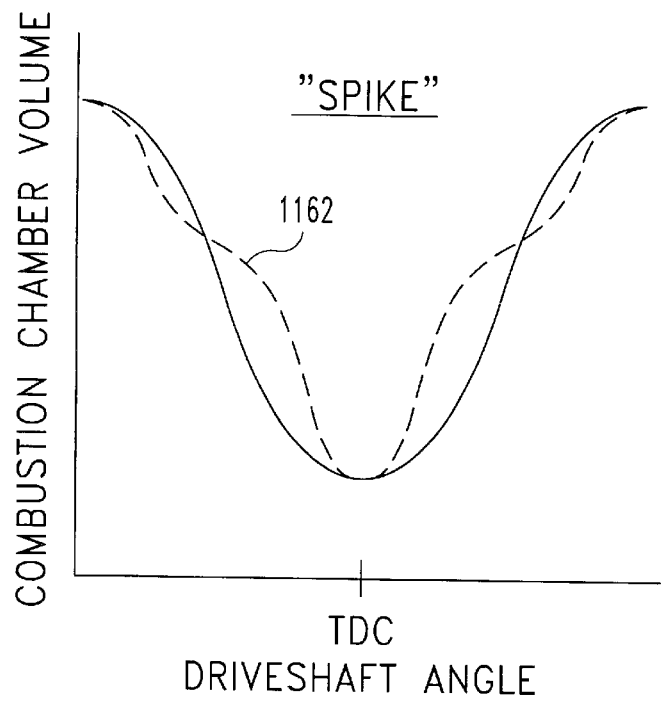
FIG. 35 is a graph of chamber volume versus driveshaft angle for a "spike" cam profile of the present invention.

Other cam profiles may be used to achieve various benefits. There are two alternative cam profiles that are especially interesting for combustion optimization. The first is shown in FIG. 34 and is referred to as a "Dwell Profile" 1160. The Dwell Profile 1160 is shown superimposed upon the sinusoidal profile of FIG. 32. The Dwell Profile 1160 creates a prolonged dwell period which would be advantageous for combustion processes that are relatively slow or for engine configurations that exhibit very high operating speeds (RPM). The second profile is the "Spike Profile" 1162 shown in FIG. 35. The Spike Profile 1162 is shown superimposed upon the sinusoidal profile of FIG. 32. The Spike Profile 1160 avoids any (or most) dwell, creating a "spike" at top dead center (TDC). This profile would be advantageous for combustion processes that are relatively fast and that have a tendency to be explosive. Also, lower RPM engines would benefit from the Spike Profile 1162 by having reduced heat rejection. Combinations of these profiles to provide specific rotor motions or similar rotor motions are expected to offer further advantages.

12. Variable Intake Port Timing

Figure 36A:
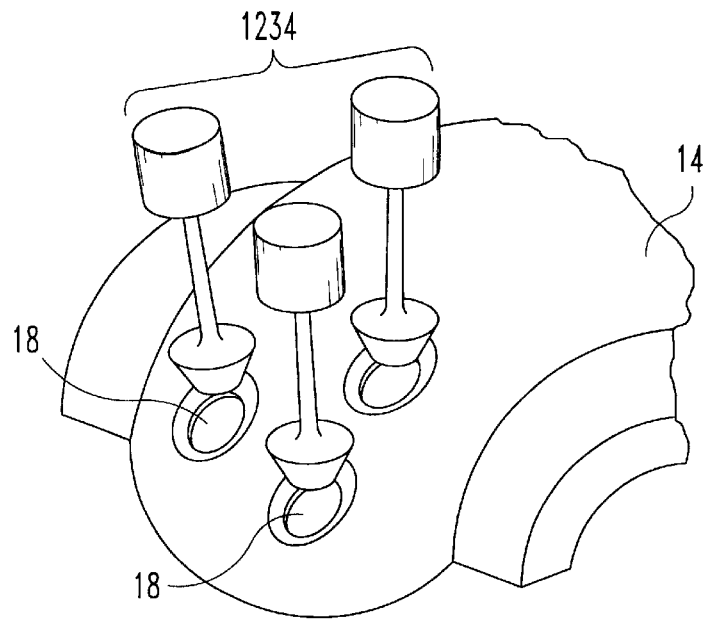
FIG. 36A is a perspective view of a valve cluster of the present invention.

Rotary engine configuration of the present invention provides for a single site where intake port 18 is situated, serving all combustion chambers 7, allowing for further economy to be realized for intake process components 1232, such as fluid control valves. FIGS. 36A and B illustrate one arrangement of fluid control valves 1232 wherein advantage of central intake port 18 is taken. A cluster 1234 of multiple outwardly opening valves is illustrated, with each valve 1232 opening outwardly in a different position in the intake region of housing 14. By opening one or more valves 1232, alone or in various combinations, a variety of intake port timing events and intake swirl amounts can be obtained. Thus, variable swirl ratios are obtained from the various options for which valve or valves 1232 to open. Shrouding of one or more valves 1232 is optional.

Figure 36B:
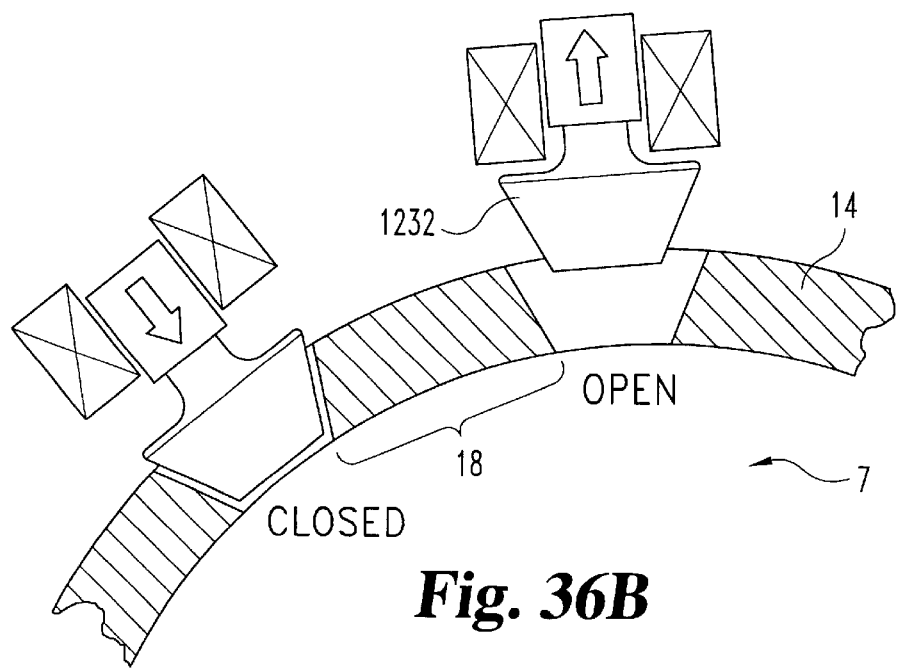
FIG. 36b is a partial side sectional view of a pair of valves emplaced in the housing of the present invention.

As is illustrated in FIG. 36B, intake valves 1232 do not need to be opened and closed for each chamber 7, but rather may act only as flow modulation devices capable of remaining static for extended periods of time. Varying the intake port timing and/or the swirl ratio of the incoming charge gasses is known to yield important benefits for combustion and for reducing pump effort. Another important benefit of the design of cluster 1234 is that pumping losses at part load are eliminated.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A rotary engine comprising, in combination:
    a housing having a fluid inlet valve and a fluid outlet valve formed therein;
    a combustion actuator operationally connected within the housing;
    a gas pressure sensor operationally connected within the housing;
    a temperature sensor operationally connected within the housing;
    a generally cylindrical driveshaft extending through the housing and having first and second tapered ends with first and second threaded recesses formed therein;
    a first plurality of drive shaft splines formed on the first tapered end of the driveshaft;
    a second plurality of drive shaft splines formed on the second tapered end of the driveshaft;
    a first rotor rotationally mounted in the housing on the driveshaft and having a first hub and a first pair of oppositely disposed partially hollow wings extending from the first hub;
    a second rotor rotationally mounted in the housing on the driveshaft having a second hub and a second pair of oppositely disposed partially hollow wings extending from the second hub;
    a first pair of oppositely disposed drive blocks pivotally mounted to the first rotor;
    a second pair of oppositely disposed drive bocks pivotally mounted to the second rotor;
    a first drive flange having a first splined central aperture mounted on the first end of the driveshaft, wherein the first splined central aperture splinedly interlocks with the first plurality of splines;
    a second drive flange having a second splined central aperture mounted on the second end of the driveshaft, wherein the second splined central aperture splinedly interlocks with the second plurality of splines;
    a first pair of oppositely disposed drive levers pivotally coupled to the first drive flange and operationally connected to the first pair of drive blocks to form a first parallelogram;
    a second pair of oppositely disposed drive levers pivotally coupled to the second drive flange and operationally connected to the second pair of drive blocks to form a second parallelogram;
    a first externally threaded fastener partially extending through the first central aperture and threadedly connected to the first threaded recess; and
    a second externally threaded fastener partially extending through the second central aperture and threadedly connected to the second threaded recess;
    an inner seal adjacently positioned between the first hub and the second hub and including an outwardly biasing member positioned between a fingered first seal portion and a complimentarily fingered second seal portion;
    a plurality of outer seals respectively positioned between each rotor wing and the housing, each outer seal having a web portion contoured to securely engage a rotor wing and a rail portion adapted to extend from the web portion inwardly over a wing and outwardly to engage the housing;
    a plurality of seal counterbalances, each counterbalance having a shaft member respectively pivotally mounted within a rotor wing and connecting a counterweight portion to an outer seal;
        wherein the first and the second rotors are rotated about 90 degrees relative to each other;
        wherein the first and second pair of wings at least partially overlap to define four chambers within the housing; and
        wherein rotors are adapted to oscillate relative to each other such that the volume of the chambers is not a constant.

2. The engine of claim 1 wherein the housing includes a first housing half and a second housing half joined together and having a substantially circular journal bearing seated therebetween.

3. The engine of claim 2 wherein the journal bearing is further positioned between the housing and a rotor hub and wherein an oil outlet is formed therebetween for fluid communication of oil to rotors.

4. The engine of claim 1 wherein a cam ring is operationally coupled to at least on of rotors and wherein rotation of the cam ring changes the angular relationship between rotors.

5. The engine of claim 1 wherein rotor hub is substantially cylindrical.

6. The engine of claim 1 wherein rotor hub is substantially frustoconical.

7. A rotary engine comprising, in combination:

a generally cylindrical shaft;

a pair of nested rotors rotationally mounted on the shaft and having inwardly extending pairs of wings;

an outer housing positioned around rotors and partially around the shaft and defining a central combustion chamber;

wherein rotors are adapted to rotate around the shaft;

wherein rotors are adapted to oscillate relative to one another as they rotate such that the chambers periodically volumetrically expand and contract as rotors rotate.

8. The rotary engine of claim 7 wherein the central combustion chamber is further divided into four subchambers defined by rotor vanes and the housing.

9. The rotary engine of claim 8 further comprising:

a fluid inlet formed through the housing allowing fluid communication with one of the four subchambers; and a fluid outlet formed through the housing allowing fluid communication with one of the four subchambers.

10. The rotary engine of claim 7 further comprising a sensor positioned in the housing and adapted to relay information regarding conditions in the central combustion chamber to an electronic controller.

11. The rotary engine of claim 7 further comprising a power transmission system including:

a first pair of rotor pins extending from the first rotor;

a rotatable driveshaft having a first end; and a drive flange operationally coupled to the first end and having a first pair of drive pins extending therefrom;

wherein the first pair of drive pins turn with the driveshaft and drivingly engage the first pair of rotor pins.

12. The rotary engine of claim 7 further comprising a timing mechanism including:

a first pair of rotor pins extending from a rotor;

a first pair of drive pins extending from a flange;

a first pair of rocker levers non-adjacently connecting the first pair of rotor pins to the first pair of drive pins, wherein each rocker lever carries two rollers;

a first pair of spacer blocks non-adjacently connecting the first pair of rotor pins to the first pair of drive pins, wherein each spacer block has a saddle bearing adapted to ride a roller; and a cam ring operationally coupled to the first pair of rocker levers and the first pair of spacer blocks;

wherein the first pair of rocker levers and the first pair of spacer blocks define a parallelogram with the first pair of rocker levers oriented in parallel with each other and the first pair of spacer blocks oriented in parallel with each other;

wherein the cam ring is adapted to dictate an angular shift between the first pair of drive pins and the first pair of rotor pins by providing an adjustable squeezing force thereupon; and wherein the force on the first pair of drive pins and the first pair of rotor pins may be adjusted by rotation of the cam ring.

13. A rotary engine comprising, in combination:

a generally cylindrical shaft;

a pair of nested rotors rotationally mounted on the shaft and having inwardly extending pairs of wings; and an outer housing positioned around rotors and partially around the shaft and defining a central combustion chamber; and wherein the rotors further comprise:

a first rotor having a first hub and a first pair of oppositely disposed partially hollow wings extending from the first hub;

a second rotor having a second hub and a second pair of oppositely disposed partially hollow wings extending from the second hub;

an inner seal including a pair of outwardly biased interlocking discs adjacently positioned between the first and second hubs; and a plurality of outer seals operationally coupled to rotors;

wherein each respective rotor wing includes an outer seal mounted thereto; and wherein each respective rotor wing includes a counterbalance positioned therein and operationally coupled to the respective rotor wing and to an outer seal mounted thereto;

wherein rotors are adapted to rotate around the shaft; and wherein rotors are adapted to oscillate relative to one another as they rotate such that the chambers periodically volumetrically expand and contract as rotors rotate.

14. An engine comprising, in combination:

a housing;

a driveshaft extending through the housing;

a pair of oppositely disposed inwardly-facing rotors rotationally mounted on the driveshaft defining a plurality of chambers within the housing;

means for introducing combustible gasses into at least on of the plurality of chambers;

means for removing combusted gasses from at least one of the chambers;

a combustion initiator operationally connected to at least one of the chambers;

wherein the pair of rotors is adapted to rotate around the driveshaft;

wherein the pair of rotors are adapted to oscillate relative to each other as they rotate.

15. A timing mechanism for a rotary engine comprising:

a first pair of rotor pins;

a first pair of drive pins;

a first pair of rocker levers non-adjacently connecting the first pair of rotor pins to the first pair of drive pins, wherein each rocker lever carries two rollers;

a first pair of spacer blocks non-adjacently connecting the first pair of rotor pins to the first pair of drive pins, wherein each spacer block has a saddle bearing adapted to ride a roller; and a cam ring operationally coupled to the first pair of rocker levers and the first pair of spacer blocks;

wherein the first pair of rocker levers and the first pair of spacer blocks define a parallelogram with the first pair of rocker levers oriented in parallel with each other and the first pair of spacer blocks oriented in parallel with each other;

wherein the cam ring is adapted to dictate an angular shift between the first pair of drive pins and the first pair of rotor pins by providing an adjustable squeezing force thereupon; and wherein the force on the first pair of drive pins and the first pair of rotor pins may be adjusted by rotation of the cam ring.

16. A rotor inner seal comprising:
a first disc having a plurality of circumferential fingers formed thereon;
a second disc having a plurality of circumferential fingers formed thereon;
a biasing member operationally connected between the first disc and the second disc and adapted to provide an outwardly biasing force thereupon;
wherein the first disc and the second disc are interlockingly coupled; and
wherein the biasing member provides a force biasing the first disc and the second disc apart.

17. A rotor outer seal comprising:
a rotor adapted to rotate within a housing;
a pair of substantially parallel seal rails; and
a contoured web connecting the pair of substantially parallel seal rails;
wherein the web is contoured to snugly fit the exterior surface of a rotor;
wherein the pair of rails is adapted to extend away from the web in the direction of rotor to provide a mount; and
wherein the pair of rails is adapted to extend away from the web in the direction opposite that of the direction of rotor to provide a seal with the housing.

18. A rotor system comprising:
a first rotor having a first hub and a first pair of oppositely disposed partially hollow wings extending from the first hub;
a second rotor having a second hub and a second pair of oppositely disposed partially hollow wings extending from the second hub;
an inner seal including a pair of outwardly biased interlocking discs adjacently positioned between the first and second hubs; and
a plurality of outer seals operationally coupled to rotors;
wherein each respective rotor wing includes an outer seal mounted thereto; and
wherein each respective rotor wing includes a counterbalance positioned therein and operationally coupled to the respective rotor wing and to an outer seal mounted thereto.

19. A timing mechanism for a rotary engine comprising:
a driveshaft;
a first rotor adapted to rotate about the driveshaft;
a second rotor adapted to rotate about the driveshaft and having an angular relationship with the first rotor;
a first cam ring operationally connected to the first rotor;
a second cam ring operationally coupled to the second rotor;
wherein the first cam ring may be rotated relative to the second cam ring;
wherein rotation of the first cam ring acts on the first rotor to change the angular relationship between the first and the second rotors;
wherein rotation of the second cam ring acts on the second rotor to change the angular relationship between the first and the second rotors.

20. The timing mechanism of claim 19 wherein rotation of the first cam ring relative to the second cam ring controls intake port timing, exhaust port timing, and pre-chamber port timing.

21. The timing mechanism of claim 19 wherein rotation of the first cam ring relative to the second cam ring defines a compression ratio.

22. The timing mechanism of claim 21 wherein the compression ratio is maximized when the first cam ring and the second cam ring are oriented to provide axial angular alignment therebetween.

23. A rotary engine comprising, in combination:
a driveshaft;
a power transmission system operationally connected to the driveshaft and further comprising:
a first winged rotor rotationally coupled to the driveshaft and having a first pair of rotor pins extending therefrom;
a second winged rotor rotationally coupled to the driveshaft and having a second pair of rotor pins extending therefrom; and
a drive flange operationally coupled to the driveshaft and having a first pair of drive pins extending therefrom; and
an outer housing positioned around rotors and partially around the shaft and defining a plurality of combustion chambers of variable volume;
wherein the first pair of drive pins turn with the driveshaft and drivingly engage the first pair of rotor pins;
wherein each rotor is free to rotate relative to the shaft and the other rotor; and
wherein the rotors are adapted to oscillate relative to one another as they rotate to periodically vary the volume of each of the combustion chambers.

24. A rotary engine comprising, in combination:
a driveshaft;
a first rotor rotationally coupled to the driveshaft;
a second rotor rotationally coupled to the driveshaft and having an angular relationship with the first rotor;
a first selectively rotatable cam ring operationally connected to the first rotor;
a second selectively rotatable cam ring operationally connected to the second rotor; and
an outer housing positioned around rotors and partially around the shaft and defining a plurality of combustion chambers of variable volume;
wherein each rotor is free to rotate relative to the shaft and the other rotor;
wherein rotation of either cam ring actuates a change in the angular relationship between the first and second rotors; and
wherein the rotors are adapted to oscillate relative to one another as they rotate to periodically vary the volume of each of the combustion chambers.

25. The rotary engine of claim 24 further comprising an actuating motor operationally connected to at least one selectively rotatable cam ring, wherein the actuating motor is adapted to selectively actuate the at least one selectively rotatable cam ring.

26. The rotary engine of claim 24 wherein the engine has a compression ratio and wherein selective rotation of either cam ring changes the compression ratio.

27. The rotary engine of claim 24 wherein the engine has an intake port timing, an exhaust port timing, and a pre-chamber port timing and wherein selective rotation of either cam ring changes the intake port timing, the exhaust port timing, and the pre-chamber port timing.

* * * * *

UNITED STATES PATENT AND TRADEMARK OFFICE
CERTIFICATE OF CORRECTION

PATENT NO. : 6,289,867 B1
DATED : September 18, 2001
INVENTOR(S) : Paul Douglas Free It is certified that error appears in the above-identified patent and that said Letters Patent is hereby corrected as shown below:

Column 5,
Line 66, replace equation (1) with the following:

$$\dot{\theta}_{RA} = \dot{\theta}_S + (1 + \sin 2\dot{\theta}_s)$$

Line 67, replace equation (2) with the following:

$$\dot{\theta}_{RB} = \dot{\theta}_S + (1 - \sin 2\dot{\theta}_s)$$

Column 12,
Line 3, replace "T" with -- τ --.
Line 26, delete equation (11.1) and replace it with the following:

$$V = \pi\beta \int_{r1}^{r2} w(r) r\, dr$$

Line 37, delete equation (11.2) and replace it with the following:

$$V = \pi\beta w \left| r^2/2 \right|_{r1}^{r2}$$

Signed and Sealed this

Twelfth Day of March, 2002

Attest:

JAMES E. ROGAN
Attesting Officer    Director of the United States Patent and Trademark Office